(12) United States Patent
Takano et al.

(10) Patent No.: US 7,574,226 B2
(45) Date of Patent: *Aug. 11, 2009

(54) SYSTEM AND METHOD FOR MOBILE COMMUNICATION

(75) Inventors: Nahoko Takano, Tokyo (JP); Kojiro Hamabe, Tokyo (JP); Soichi Tsumura, Tokyo (JP); Mariko Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 525 days.

This patent is subject to a terminal disclaimer.

(21) Appl. No.: 10/547,073

(22) PCT Filed: Apr. 21, 2004

(86) PCT No.: PCT/JP2004/005694

§ 371 (c)(1),
(2), (4) Date: Aug. 26, 2005

(87) PCT Pub. No.: WO2004/095860

PCT Pub. Date: Nov. 4, 2004

(65) Prior Publication Data

US 2006/0159061 A1 Jul. 20, 2006

(30) Foreign Application Priority Data

Apr. 23, 2003 (JP) ............................. 2003-117735

(51) Int. Cl.
*H04B 7/00* (2006.01)
*H04W 72/00* (2009.01)

(52) U.S. Cl. ...................................... 455/517; 455/450

(58) Field of Classification Search ....................... None
See application file for complete search history.

(56) References Cited

U.S. PATENT DOCUMENTS 6,243,579 B1 * 6/2001 Kari .......................... 455/426.1

(Continued)

FOREIGN PATENT DOCUMENTS

JP 03-147430 A 6/1991

(Continued)

OTHER PUBLICATIONS

3$^{rd}$ Generation Partnership Project (3GPP), Technical Report: "Technical Specification Group Radio Access Network; High Speed Downlink Packet Access: Physical Layer Aspects" (Release 5), TR 25.858, V5.0.0, Mar. 2002, pages 1-31.

*Primary Examiner*—Barry W Taylor
(74) *Attorney, Agent, or Firm*—Sughrue Mion, PLLC

(57) ABSTRACT

Pluralities of state update frames are defined. The base station is configured to transmit a state update data to instruct the mobile station to be set to either an active state or a suspended state, in the state update frames. The base station is configured to transmit a packet only to the mobile station that has been set to the active state by the state update data. The base station notifies the mobile station of a packet transmission by transmitting a control data including a data necessary to receive the packet, earlier than the packet transmission by a predetermined time. The mobile station is configured to receive the control data and the packet when being set to the active state, and is configured to not receive the control data and the packet when being set to the suspended state.

36 Claims, 18 Drawing Sheets

U.S. PATENT DOCUMENTS

| | | | |
|---|---|---|---|
| 6,477,151 B1 * | 11/2002 | Oksala | 370/314 |
| 7,209,762 B2 * | 4/2007 | Matsumoto et al. | 455/517 |
| 7,301,950 B1 * | 11/2007 | Cheong et al. | 370/395.21 |
| 2002/0172192 A1 * | 11/2002 | Hunzinger et al. | 370/352 |
| 2003/0193915 A1 * | 10/2003 | Lee et al. | 370/335 |
| 2004/0002330 A1 * | 1/2004 | Chitrapu | 455/426.2 |
| 2004/0196820 A1 * | 10/2004 | Hsu et al. | 370/342 |
| 2007/0201396 A1 * | 8/2007 | Hautamaki et al. | 370/329 |

FOREIGN PATENT DOCUMENTS

| | | |
|---|---|---|
| JP | 11-177523 A | 7/1999 |
| JP | 2000-224231 A | 8/2000 |
| JP | 2002-300173 A | 10/2002 |
| JP | 2002-369258 A | 12/2002 |

* cited by examiner

SYSTEM AND METHOD FOR MOBILE COMMUNICATION

TECHNICAL FIELD

The present invention relates to a system and method for radio communications, and more particularly to a system and method for radio communications suitable for HSDPA (High Speed Downlink Packet Access).

BACKGROUND ART

HSDPA (High Speed Downlink Packet Access) is known as a communication method to carry out high-speed packet transmission through a downlink of a mobile communications system. Details of HSDPA are reported in 3GPP TR (Technical Report) 25. 858, V5.0.0 (March, 2002), and the overall disclosure of it is incorporated into this description by reference.

FIG. 18 is a block diagram showing a typical mobile communication system using HSDPA. The mobile communication system includes a base station 1, a mobile station 2, and a base station control apparatus 3 connected to the base station 1. The base station 1 and the mobile station 2 are connected through a radio link.

A downlink of the radio link connecting the base station 1 and the mobile station 2 is composed of CPICH (common pilot channel), HS-PDSCH (high speed physical downlink shared channel), HS-SCCH (high speed shared control channel), and downlink DPCH (downlink dedicated physical channel). CPICH is used to transmit a pilot signal to all mobile stations in a cell controlled by the base station 1. The pilot signal is transmitted from the base station 1 in a predetermined electric power, and is used for path search, estimation of a transmission path, and measurement of DL (Downlink) receiving quality. HS-PDSCH is used to transmit a user data as a packet. HS-PDSCH is used in a time divisional multiplexing manner, and is shared by the mobile stations 2. The HS-SCCH is used to transmit a control data necessary to receive a packet transmitted through the HS-PDSCH. Each of the mobile stations 2 receives the packet transmitted through the HS-PDSCH based on the control data. Each of the mobile stations 2 can receive four of HS-SCCH at maximum. HS-SCCH is used in a time divisional multiplexing manner, and is shared by the mobile stations 2. The downlink DPCH is used to transmit an individual channel data from the base station 1 to the mobile station 2. The individual channel data includes a user data, an upper layer control data and the like. The downlink DPCH is composed of a DPCCH (dedicated physical control channel) and DPDCH (dedicated physical data channel). DPCCH is used to transmit such a control data for a physical layer as TPC (transmit power control) bits, which are transmission power control data of DPDCH, and TFCI (transport format combination indication) that indicates a configuration of the DPDCH. DPDCH is used to actually transmit the individual channel data.

On the other hand, an uplink is composed of HS-DPCCH (high speed dedicated physical control channel) and uplink DPCH (uplink dedicated physical channel). HS-DPCCH is used to transmit CQI (channel quality indication) determined based on a result of CPICH quality measurement, and ACK/NACK message (acknowledgement/negative acknowledgement message). The ACK/NACK message is a data for notifying to the base station 1 that the mobile station 2 has correctly received a packet. The uplink DPCH is used to transmit the individual channel data to the base station 1 from the mobile station 2. The configuration of the uplink DPCH is the same as that of the downlink DPCH.

Transmission of packets from the base station 1 to the mobile station 2 in HSDPA is carried out roughly as described below. The mobile station 2 always monitors HS-SCCH (High Speed Shared Control Channel) of 4 channels at a maximum specified by the base station 1. The mobile station 2 determines whether a mobile station ID (identifier) transmitted through HS-SCCH coincides to a mobile station ID assigned to itself. When finding the mobile station ID assigned to itself in a control data transmitted through HS-SCCH, the mobile station 2 uses the control data transmitted through HS-SCCH to receive a packet transmitted through HS-PDSCH after the transmission of the mobile station Id by a predetermined delay time.

The base station 1 and the mobile station 2 immediately transmit individual channel data through the downlink DPCH or the uplink DPCH when the individual channel data must be transmitted.

One problem of HSDPA is in that power consumption of the mobile station is large. Two reasons are found in the large power consumption. One reason is in that the mobile station needs to always monitor HS-SCCH because a timing when the packet is transmitted is not informed. Therefore, the mobile station consumes a large amount of power even for reception of the packet for a short period of time. Especially, this problem is serious in HSDPA that is used for a service in which data download is intermittently repeated, as in web browsing. The other reason of the large power consumption is in that DPCH must be always set to an active state. When individual channel data needs to be transmitted, HSDPA is defined such that the individual channel data is transmitted through uplink/downlink DPCH. This means that it is necessary to set DPCH to the active state, regardless of presence or absence of packet transmission. More specifically, even when the mobile station does not transmit the individual channel data, the mobile station carries out on reception and transmission through DPCCH on the uplink/downlink DPCH such that the individual channel data can be immediately transmitted, if necessary. This undesirably increases the power consumption of the mobile station.

The undesirable increase in the power consumption of the mobile station also causes a problem in communication service other than HSDPA. For example, an individual channel must be always set to the active state regardless of presence or absence of data transmission, even in a packet transmission through the individual channel and control signal transmission for an upper layer such as a hand-over and an application. Thus, in these communication services, there is such a problem that the mobile station continues to consume power even when no data is transmitted.

Therefore, it is convenient if a mobile communication system is provided that immediately can transmit packet and/or control data, if necessary, while reducing power consumption of the mobile station.

DISCLOSURE OF INVENTION

An object of the present invention is to provide a mobile communication system that can immediately transmit a packet and/or control data according to necessary, while reducing power consumption of a mobile station.

A mobile communication system includes a base station, and a mobile station configured to communicate with the base station. A plurality of state update frames are defined in a time domain in a communication protocol between the base station and the mobile station. The base station is configured to be able to transmit a state update data in each of the plurality of state update frames to indicate which of an active state and a suspended state the mobile station should be set to, and to transmit a packet only to the mobile station which has been set to the active state based on the state update data. The base station pre-announces transmission of the packet to the mobile station earlier by a predetermined time than the transmission of the packet by transmitting a control data containing data necessary to receive the packet. The mobile station is configured to be set to one of the active state and the suspended state in response to the state update data, to be able to receive the control data and the packet when the mobile station is set to the active state, and to be not able to receive the control data and the packet when the mobile station is set to the suspended state.

More specifically, the base station transmits an activate notice as the state update data when there are packets to be transmitted to the mobile station, and a suspend notice as the state update data when there is no packet. When receiving the activate notice, the mobile station is set to the active state, and when receiving the suspend notice, the mobile station is set to the suspended state.

Such architecture is preferable to the mobile communication system that supports HSDPA (High Speed Downlink Packet Access) particularly. In this case, the state update data is preferably transmitted from the base station to the mobile station through HS-SCCH (High Speed Shared Control Channel). In addition, a length of the plurality of state update frames is preferably longer than TTI (transmission time interval) of HS-SCCH. TTI of HS-SCCH is equal to or shorter than 10 ms, and is too short to update the state of the mobile station in accordance with the presence/non-presence of the packets to be transmitted to the mobile station. Therefore, it is not preferable to update the state of the mobile station for every TTI.

When the mobile station receives the packet from the base station correctly at a first state update frame of the plurality of state update frames, the mobile station is preferably set to the active state in a second state update frame subsequent to the first state update frame regardless of the state update data. Such architecture reduces switching the state in accordance with the state update data, and effectively improves endurance to a communication error of the state update data.

When the mobile station receives the packet from the base station correctly, the mobile station transmits a delivery confirmation data to the base station to notify the correct reception of the packet from the mobile station, and the base station does not preferably transmit the state update data in the second state update frame when receiving the delivery confirmation data. Such architecture reduces switching the state in accordance with the state update data, and effectively improves endurance to a communication error of the state update data.

When the base station does not receives the delivery confirmation data in the first state update frame of the plurality of state update frames, it is preferable for the base station to transmit the state update data in the second state update frame subsequent to the first state update frame.

When the mobile communication system supports HSDPA (High Speed downlink Packet Access), it is preferable that the delivery confirmation data is an ACK/NACK message.

Preferably, when the mobile station receives an activate notice corresponding to the active state as the state update data from the base station, the mobile station continues the active state during an active state duration time which begins from a time when the activate notice is received, regardless of the state update data, and the mobile station is set to the suspended state when the active state duration time ends. The active state duration time is longer than the plurality of state update frames.

In this case, it is preferable that when the base station transmits the activate notice to the mobile station, the base station does not transmit the state update data to the mobile station during the active state duration time which begins from a time when the activate notice is transmitted.

The above-mentioned the active state duration time is preferably variable. Specifically, the active state duration time is preferably determined based on a load of the base station. Specifically, further, the active state duration time is preferably determined based on a number of mobile stations connected with the base station, a maximum transmission rate between the mobile station and the base station, or a service mode provided for the mobile station.

The base station of the present invention communicates a mobile station based on a communication protocol in which a plurality of state update frames are defined in a time domain. The base station includes a state update data generating section configured to generate a state update data which is used to set the mobile station to one of an active state in which the mobile station can communicate with the base station, and a suspended state in which the mobile station cannot communicate with the base station, and a transmitting section configured to transmit the state update data to the mobile station in each of the plurality of state update frames.

When the communication protocol supports HSDPA (High Speed downlink Packet Access), it is preferable that the transmission section transmits the state update data to the mobile station through HS-SCCH (High Speed Shared Control Channel).

In the preferred embodiment, when the transmitting section receives a delivery confirmation data to notify to have received the packet correctly at the first state update frame of the a plurality of state update frame to from the mobile station, the transmitting section does not transmit the state update data to the first state update frame at the continuing second state update frame. In this case, when the transmitting section does not receive the delivery confirmation data to notify to have received the packet correctly at the first state update frame of the a plurality of state update frame to from the mobile station, the transmitting section transmits the state update data to the first state update frame at the continuing second state update frame.

In another preferred embodiment, when the transmitting means transmits the activate notice as the state update data to the mobile station to set the mobile station to the active state, the transmitting means does not transmit the state update data during the active state duration time which begins from a time when the activate notice has been transmitted.

A mobile station of the present invention communicates with a base station based on a communication protocol in which a plurality of state update frames are defined in a time domain. The mobile station includes a receiving section configured to receive a state update data from the base station in each of a plurality of state update frames, and a setting section configured to set the mobile station to one of an active state in which the mobile station can communicate with the base station and a suspended state about in which the mobile station cannot communicate with the base station.

When the communication protocol supports HSDPA (High Speed downlink Packet Access), it is preferable that the receiving section receives the state update data to the mobile station through HS-SCCH (High Speed Shared Control Channel).

When the receiving station receives a packet from the base station correctly in a first state update frame in the plurality of state update frames, it is preferable that the setting section sets the mobile station to the active state at a second state update frame subsequent to the first state update frame regardless of the state update data.

Preferably, the mobile station further includes a transmitting section transmits the delivery confirmation data to the base station to notify the correct reception of the packet from the base station in the first state update frame, when the receiving station receives a packet from the base station correctly in the first state update frame in the plurality of state update frames.

Preferably, when the receiving section receives an activate notice corresponding to the active state as the state update data from the base station, the setting section sets the mobile station to the active state during the active state duration time which begins from a time when the activate notice is received, regardless of the state update data, and sets the mobile station to the suspended state when the active state duration time ends. The active state duration time is longer than a time length of the plurality of state update frames.

A base station control apparatus is for a mobile communication system in which a base station and a mobile station communicate based on a communication protocol in which a plurality of state update frames are defined in time domain, the base station can transmit a state update data in each of the plurality of state update frames, and the mobile station is set to one of an active state, in which the mobile station can communicate with the base station and a suspended state in which the mobile station cannot communicate with the base station, in response to the state update data.

The base station control apparatus includes a generating section configured to generate an active state duration time change notice to instruct a length of an active state duration time which is started when the mobile station receives an activate notice to set the mobile station to the active state, and during which the mobile station is set to the active state, and a transmitting section configured to transmit the active state duration time change notice to the base station. The active state duration time is longer than a time length of the plurality of state update frames.

It is preferable that the generating section determines the active state duration time change notice such that the active state duration time is variable. Specifically, the generating section determines the active state duration time based on a load of the base station. More specifically, it is preferable that the generating section determines the active state duration time based on a number of the mobile stations connected with the base station, a maximum transmission rate between the mobile station and the base station, or a service mode that is provided for the mobile station.

The base station, mobile station and base station control apparatus of the present invention are installed with computer program products with program codes to define the operations of the base station, mobile station and base station control apparatus and execute the program codes.

BEST MODE FOR CARRYING OUT THE INVENTION

Figure 1:
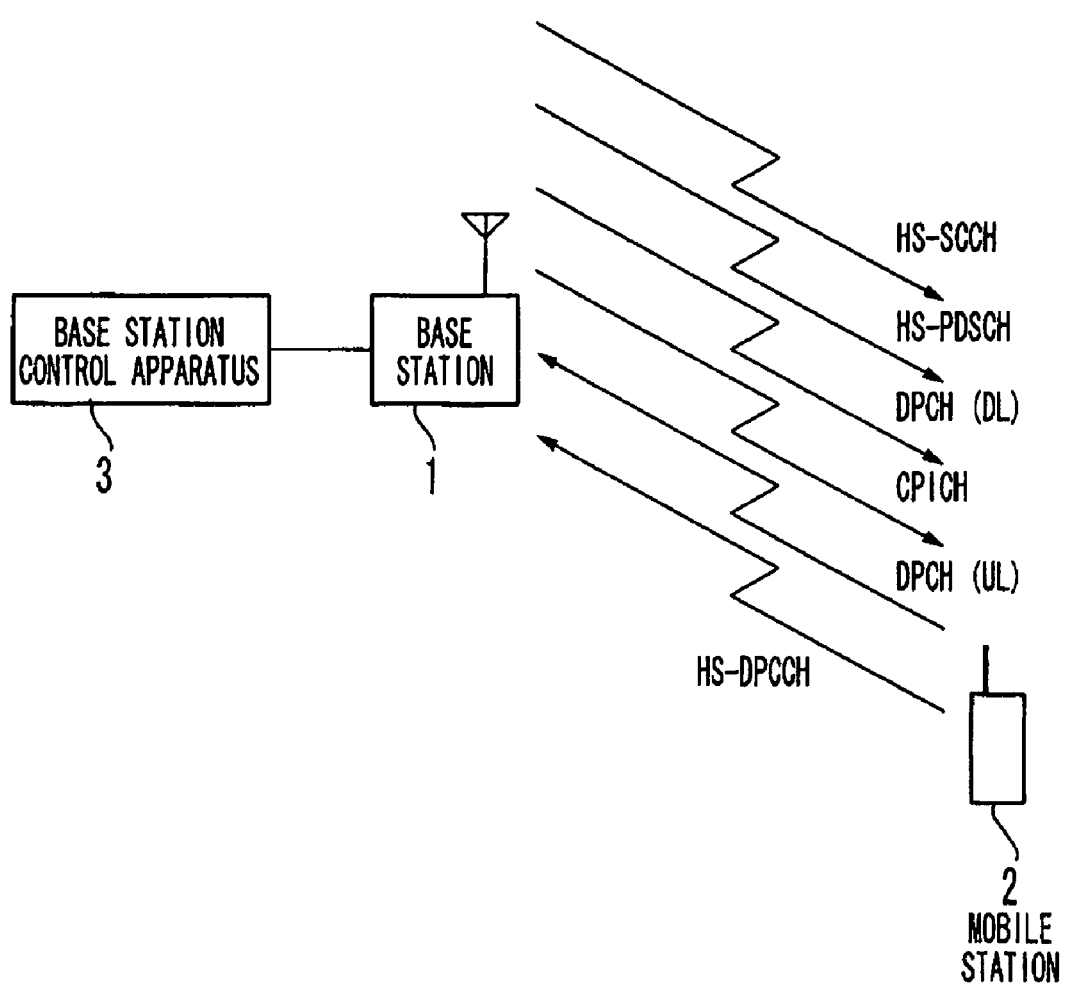
FIG. 1 is a block diagram showing a configuration of a mobile communication system in a first embodiment of the present invention.

Hereinafter, a mobile communication system according to the present invention will be described in detail with reference to the attached drawings. It should be noted that the same reference numerals or symbols are assigned to identical or similar components in the drawings.

FIRST EMBODIMENT

FIG. 1 is a block diagram showing a configuration of the mobile communication system according to the first embodiment of the present invention. The mobile communication system is provided with a base station 1, a mobile station 2, and a base station control apparatus 3.

The mobile communication system in the first embodiment supports HSDPA. Specifically, a downlink and an uplink that connect the base station 1 and the mobile station 2 are substantially configured as defined in 3GPP TR (Technical Report) 25. 858, V5.0.0 (March, 2002). The downlink is composed of CPICH (common pilot channel), HS-PDSCH (high speed physical downlink shared channel), HS-SCCH (high speed shared control channel), and downlink DPCH (downlink dedicated physical channel). The uplink is composed of HS-DPCCH (high speed dedicated physical control channel) and uplink DPCH (uplink dedicated physical channel).

Communication between the base station 1 and the mobile station 2 is substantially subjected to the definition in HSDPA. When the base station 1 transmits a packet to the mobile station 2, the base station 1 previously notifies packet transmission to the mobile station 2 that is a destination of the packet. Specifically, the base station 1 transmits a mobile station ID (identifier) of the mobile station 2 as the destination, and control data necessary to receive the packet through the HS-SCCH (High Speed Shared Control Channel). Subsequently, the base station 1 transmits the packet to the mobile station 2 through HS-PDSCH after the transmission of the mobile station ID by a predetermined time.

The mobile station 2 always monitors or observes HS-SCCH of 4CH (Channel) at a maximum specified by the base station 1, and determines whether the mobile station ID transmitted through HS-SCCH coincides with the mobile station ID of the mobile station. When the mobile station 2 finds the mobile station ID of its own station in a data transmitted through HS-SCCH, the mobile station 2 receives the control data transmitted through HS-SCCH. The mobile station 2 further receives the packet transmitted through HS-PDSCH based on the control data after the transmission of the mobile station ID by the predetermined time.

Additionally, the mobile communication system in the first embodiment has a function to extend HSDPA. The difference between the extended HSDPA in the first embodiment and a conventional HSDPA is that a plurality of state update frames are defined in a time domain in the extended HSDPA, and a "state update data" is additionally transmitted through HS-SCCH. The plurality of state update frame is a constant time period that is defined in HS-SCCH separately from TTI (transmission time interval), and the time length of the state update frames is much longer than that of TTI, for example, is 100 seconds. The state update data is a data for specifying the state of the mobile station 2 in each state update frame.

There are two kinds of states for the mobile station 2 to be specified based on the state update data: an active state and a suspended state. The active state is a state in which the mobile station 2 operates as defined in HSDPA. That is, the active state is a state in which the mobile station 2 receives the control data necessary for packet communication and receives the packet from the base station 1. If the active state is set, power is supplied to all circuits that are related to the transmission and reception of the mobile station 2 subjected to HSDPA. On the other hand, the suspended state is a state in which the mobile station 2 does not carry out the transmission and reception of HSDPA. If the suspended state is set, the power supply to the circuits related to the transmission and reception carried out in accordance with HSDPA is stopped to reduce power consumption in the mobile station 2. The state update data is transmitted from the base station 1 to the mobile station 2 in each state update frame. The mobile station 2 is then set to a state specified based on the state update data in each state update frame. The mobile station 2 is set to the suspended state in response to the state update data during the time period while the mobile station 2 does not transmit and receive a packet and individual channel data or stops transmission and reception of the packet and individual channel data. Thus, the mobile station 2 can reduce power consumption during a packet waiting state, and immediately transmit and receive data, according to necessary.

(Configuration of the Base Station)

Figure 2:
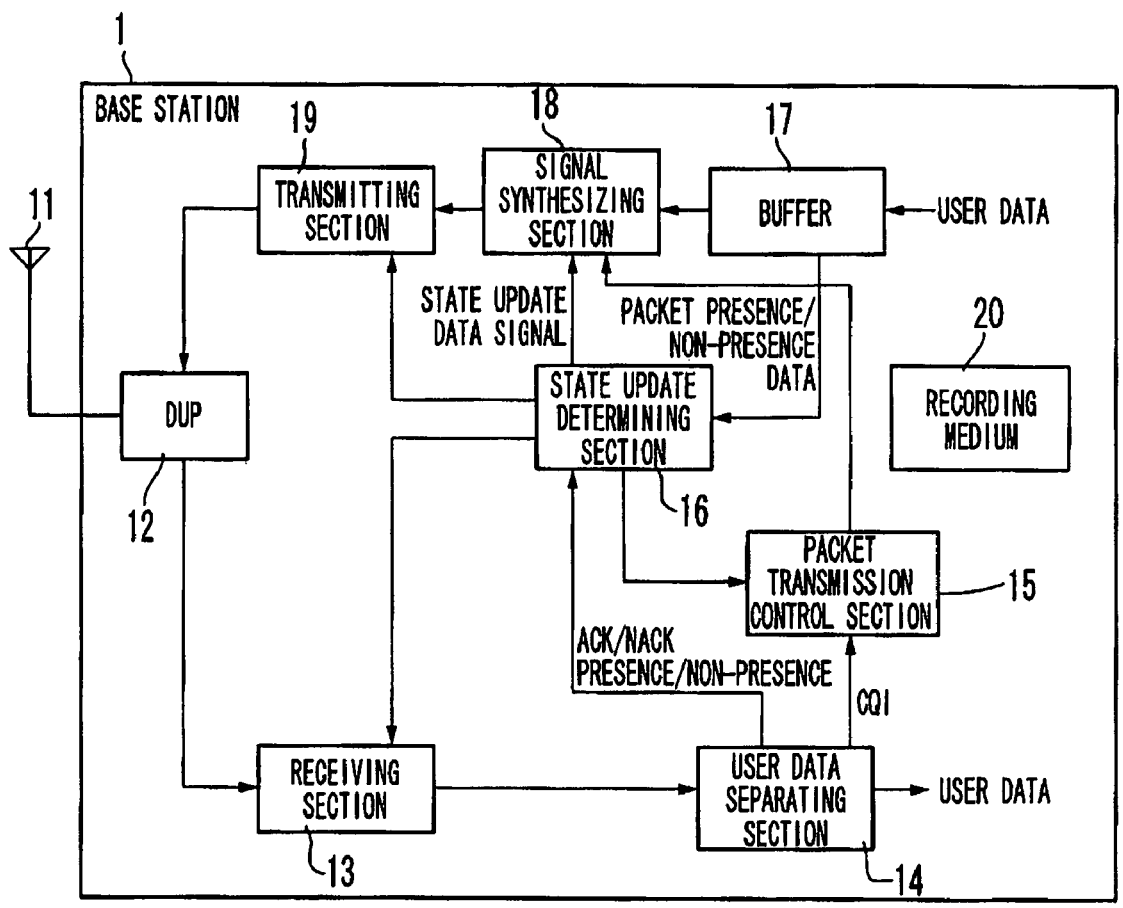
FIG. 2 is a block diagram showing a configuration of a base station.

FIG. 2 is a block diagram showing a configuration of the base station 1. The base station 1 is configured to contain an antenna 11, a duplexer (DUP) 12, a receiving section 13, a user data separating section 14, a packet transmission control section 15, a state update determining section 16, a buffer 17, a signal synthesizing section 18, a transmitting section 19, and a recording medium 20. The base station 1 is further provided with a call control section, a voice input and output section, and a display section (not shown). Functions of these sections are known to those skilled in the art and, therefore, details thereof are not described.

The receiving section 13 sends a reception signal received through the antenna 11 and the duplexer 12 to the user data separating section 14. The reception signal is formed from signals transmitted through HS-DPCCH and uplink DPCH.

The user data separating section 14 takes out a user data (e.g., voice data, image data and the like) and a control data (e.g., CQI and the like) from the reception signal sent from the receiving section 13. The user data separating section 14 then sends the user data to the above-mentioned call control section, voice input and output section, and display section of the base station 1, and the control data to the packet transmission control section 15.

The packet transmission control section 15 carries out transmission control of a packet temporarily stored in the buffer 17 in response to CQI from the user data separating section 14 and an active mobile station data from the state update determining section 16.

The state update determining section 16 determines a state of each mobile station 2, and carries out scheduling of packet transmission. The state update determining section 16 determines whether the mobile station 2 should be in the active state or the suspended state, based on presence or absence of packets temporarily stored in the buffer 17. Based upon the determining result, the state update determining section 16 further sends the active mobile station data to the packet transmission control section 15, a state update data to be transmitted to the mobile station 2 to the signal synthesizing section 18, and an individual channel transmission and reception ON/OFF signal to the receiving section 13 and the transmitting section 19. In addition, the state update determining section 16 detects an ACK/NACK message outputted from the user data separating section 14. When the state update determining section 16 confirms that the ACK/NACK message has been transmitted to the base station 1 to indicate that a packet had been correctly received by the mobile station 2, the state update determining section 16 regards the mobile station 2 as being in the active state in the next state update frame and carries out scheduling of packet transmission.

The buffer 17 temporarily stores the user data (packets) to be transmitted to the mobile station 2.

The signal synthesizing section 18 generates a data to be transmitted through HS-SCCH, downlink DPCH, and HS-PDSCH from the user data (packets) stored temporarily in the buffer 17 and from the state update data by the state update determining section 16. The generated data is transmitted from the antenna 11 through the transmitting section 19 and the duplexer 12.

The recording medium 20 stores a computer program for realizing processes of the respective sections of the base station 1, especially of the packet transmission control section 15 and the state update determining section 16.

(Configuration of the Mobile Station)

Figure 3:
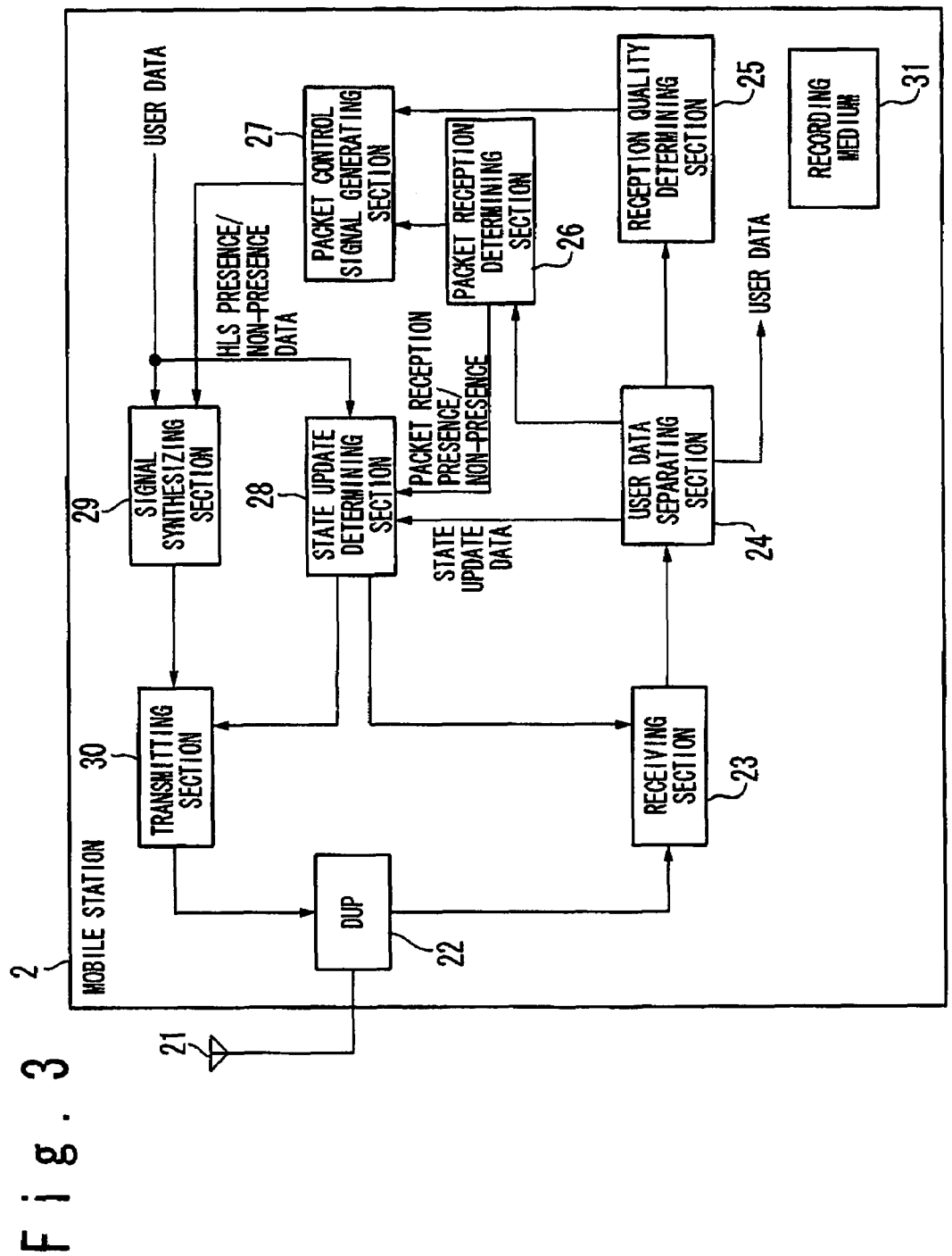
FIG. 3 is a block diagram showing a configuration of a mobile station.

FIG. 3 is a block diagram showing a configuration of the mobile station 2. The mobile station 2 is configured to contain an antenna 21, a duplexer 22, a receiving section 23, a user data separating section 24, a reception quality measuring section 25, a packet reception determining section 26, a packet control signal generating section 27, a state update determining section 28, a signal synthesizing section 29, a transmitting section 30, and a recording medium 31. The mobile station 2 further includes a call control section, a voice input and output section, and a display section (not shown).

Functions of these sections are known to those skilled in the art, and details thereof are not described.

The receiving section 23 sends a reception signal received through the antenna 21 and the duplexer 22, to the user data separating section 24. The reception signal received by the receiving section 23 is formed from signals transmitted through CPICH, downlink DPCH, HS-SCCH, and HS-PDSCH.

The user data separating section 24 takes out the user data (e.g., voice data, image data and the like) and the control data from the reception signal sent from the receiving section 23. The user data separating section 24 then sends the user data to the above-mentioned call control section, voice output section, and display section of the mobile station 2, and transmits the control data to the packet reception determining section 26 and the state update determining section 28.

The reception quality measuring section 25 measures the reception quality of CPICH, and outputs the measuring result to the packet control signal generating section 27. A signal-interference ratio (SIR) is used for the reception quality. The signal-interference ratio is defined as Ec/Io where Ec is energy per chip and Io is interference power per unit frequency.

The packet reception determining section 26 determines whether or not the control data notifying a packet transmission timing has been transmitted through HS-SCCH, and whether or not the packet from the base station 1 has been correctly received, based upon the control data from the user data separating section 24. The packet reception determining section 26 then outputs the determining results to the packet control signal generating section 27.

The packet control signal generating section 27 generates the ACK/NACK message as the transmission confirmation data of the received packet, and CQI that is based on the measuring result from the reception quality measuring section 25, in response to the determining result from the packet reception determining section 26. The packet control signal generating section 27 then sends the ACK/NACK message and CQI to the signal synthesizing section 29.

The state update determining section 28 determines the state (active/suspended state) in the state update frame in response to the control data from the user data separating section 24 and a data that shows whether or not an individual channel data is included in the user data inputted to the signal synthesizing section 29. The state update determining section 28 then notifies its state to the receiving section 23 and the receiving section 30. When confirming the packet reception, the state update determining section 28 determines that the state in the next state update frame is active, irrespective of the state update data transmitted from the base station 1.

The signal synthesizing section 29 synthesizes the data from the packet control signal generating section 27 (i.e., ACK/NACK message and CQI) and input signals supplied from the call control section and voice input section of the mobile station 2. The signal synthesizing section 29 then generates a data to be transmitted to the base station 1 through DPCH (UL) and HS-DPCCH. The generated data is transmitted from the antenna 21 through the transmitting section 30 and the duplexer 22.

The recording medium 30 stores a computer program for realizing processes of the respective sections of the base station 1 (particularly, the packet reception determining section 26, the packet control signal generating section 27, and the state update determining section 28).

(Operation of the Mobile Communication System)

Figure 4:
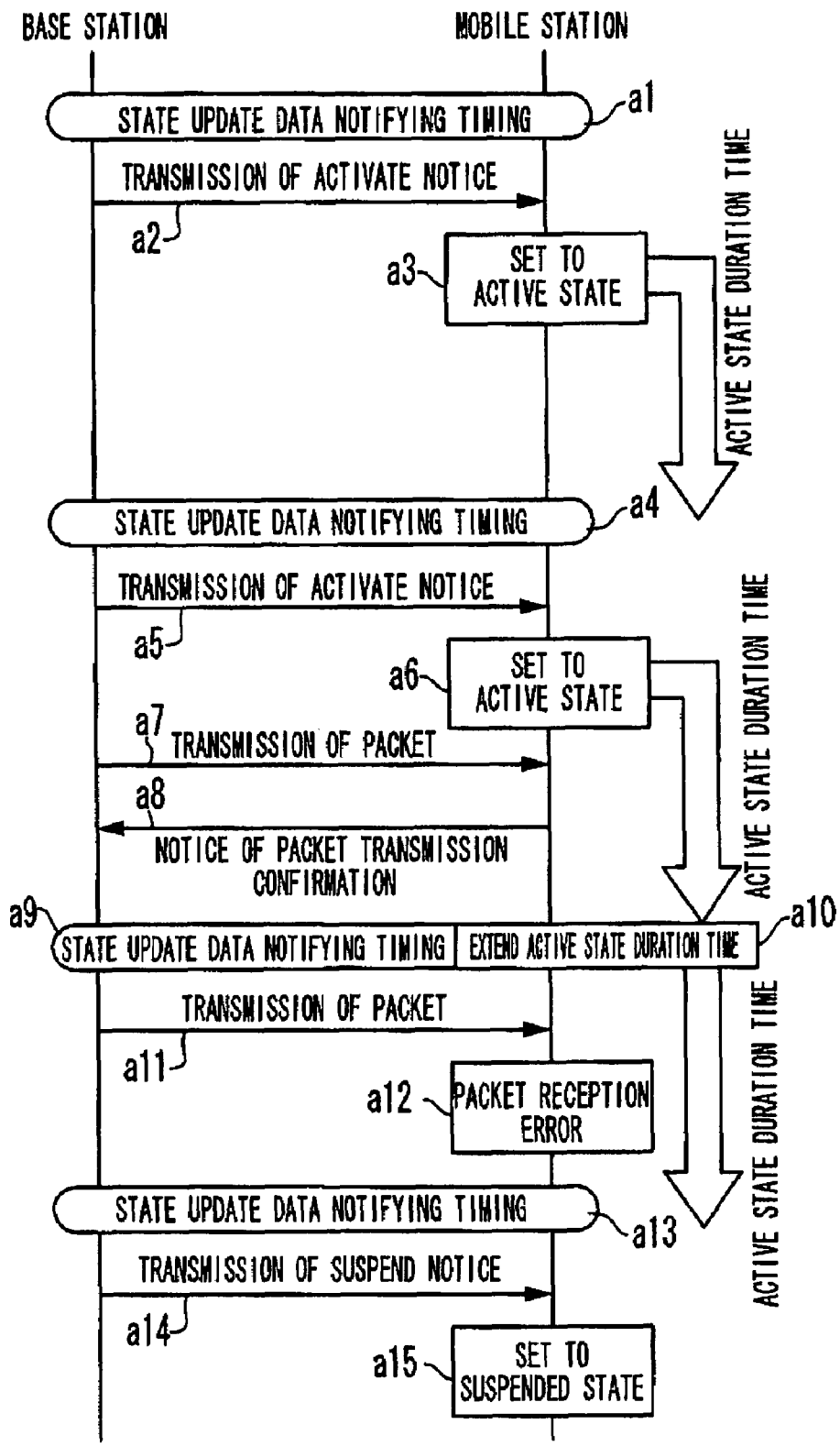
FIG. 4 is a sequence chart showing an operation of the mobile communication system according to the first embodiment of the present invention.

FIG. 4 is a sequence chart showing an operation of the mobile communication system according to the first embodiment of the present invention. The base station 1 is configured to notify a state update data at the beginning of a state update frame. At the timing to notify the state update data (to be referred to as "state update data notifying timing" hereinafter), the base station 1 determines whether any data to be transmitted to the mobile station 2 exists in the buffer (step a1). When there is the data to be transmitted to the mobile station 2, the base station 1 transmits an activate notice as the state update data to the mobile station 2 (step a2). The activate notice is an instruction notice to set the mobile station 2 to the active state.

The mobile station 2 is set to the active state in response to the activate notice (step a3). When being set to the active state, the mobile station 2 communicates with the base station 1 through downlink/uplink DPCH, HS-SCCH, HS-PDSCH, and HS-DPCCH. When the mobile station 2 does not receive or stops reception of any packet during the state update frame, the mobile station 2 receives the next state update data at the next state update data notifying timing (steps a4 and a5).

When the mobile station 2 receives the packet through HS-PDSCH within the current state update frame (step a7), the mobile station 2 transmits an ACK/NACK message to the base station 1 to notify that the packet has been correctly received (step a8). Further, the mobile station 2 keeps the active state even in the next state update frame (steps a9 and a10).

On the other hand, when the base station 1 receives the ACK/NACK message for the packet transmitted to the mobile station 2, the base station 1 regards the mobile station 2 to be in the active state even in the next state update frame (step a9), and carries out scheduling of packet transmission. In other words, when the base station 1 receives the ACK/NACK message to indicate that the packet has been correctly received by the mobile station 2, the base station 1 does not transmit or stops transmission of the state update data at the beginning of the next state update frame.

Further, when the base station 1 transmits a packet to the mobile station 2 (step a11) but the mobile station 2 fails to receive the packet transmission notice to be notified through HS-SCCH (step a12), the mobile station 2 does not transmit or stops transmission of the ACK/NACK message. Therefore, the base station 1 does not receive or stops reception of the ACK/NACK message corresponding to the transmitted packet. Consequently, unless the mobile station 2 does not correctly receive another packet, the base station 1 transmits the state update data at the next state update data notifying timing (steps a13 and a14). The mobile station 2 receives the state update data at the beginning of the next state update frame (step a14).

On the other hand, when the mobile station 2 receives the suspend notice as the state update data (step a14), the mobile station 2 is set to the suspended state (step a15). The mobile station 2 suspends communication through downlink/uplink DPCH, HS-SCCH, HS-PDSCH, and HS-DPCCH until the next state update frame.

In addition, when the base station 1 transmits the state update data to instruct the mobile station 2 to be set to the suspended state (step a14), the base station 1 suspends the communication with the mobile station 2 through uplink/downlink DPCH, and scheduling of packet transmission for the mobile station 2 until the next state update frame.

(Operation of the Base Station)

Figure 5:
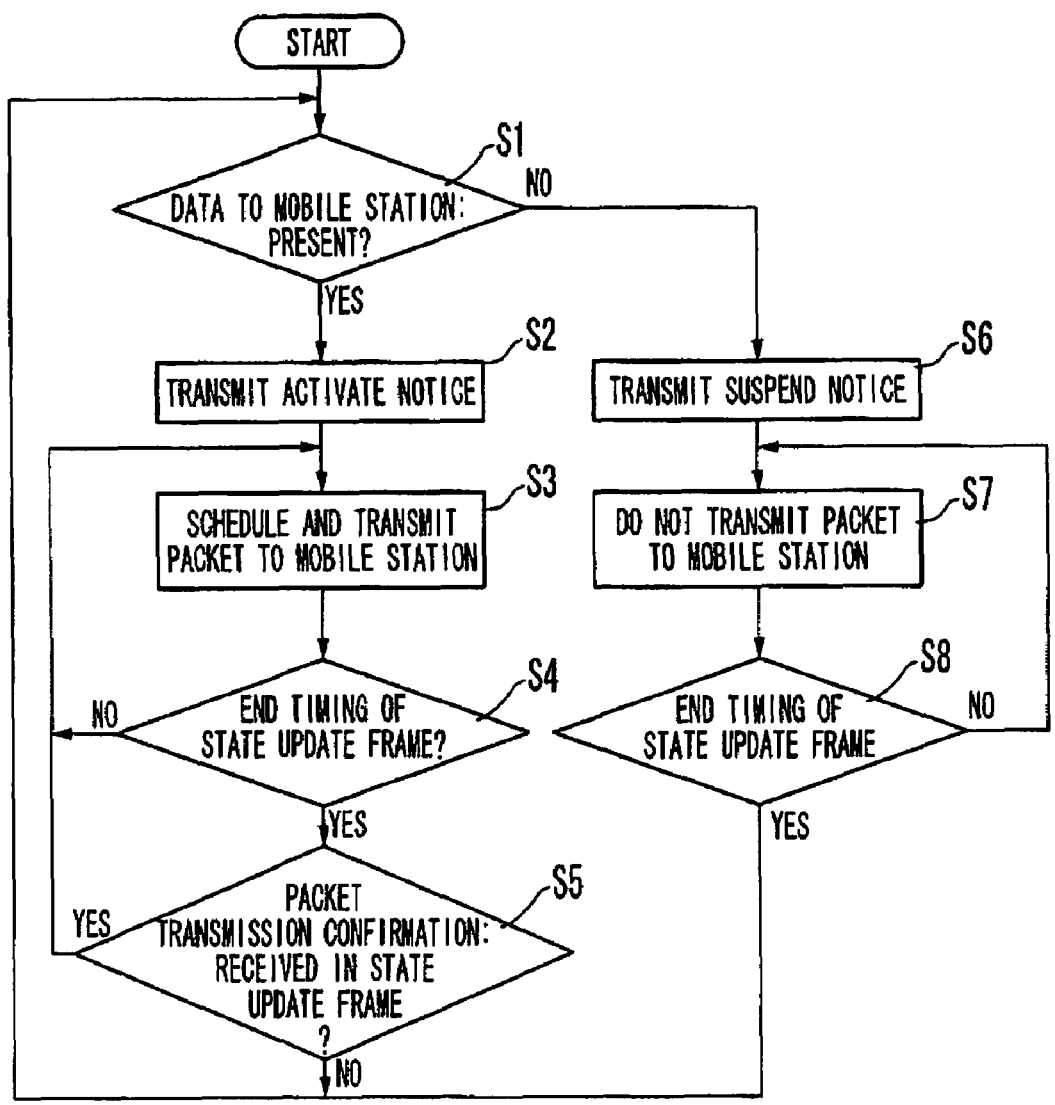
FIG. 5 is a flow chart showing an operation of the base station.

FIG. 5 is a flow chart showing an operation of the base station 1. It should be noted that the process shown in FIG. 5 is realized by the base station 1 executing the program stored in the recording medium 20.

When there is any data for the mobile station 2 at the beginning of the state update frame (step S1), the base station 1 transmits the activate notice as the state update data (step S2). Further, the base station 1 starts the communication with the mobile station 2 through downlink/uplink DPCH, and scheduling of packet transmission to the mobile station 2 (step S3 in FIG. 5).

The base station 1 carries out the above-mentioned process until the state update frame ending timing T1 (step S4). If the base station 1 receives at least one ACK/NACK message until the end of the state update frame ending timing T1 (step S5), the base station 1 regards the mobile station 2 to be in the active state at the next state update frame starting timing. The base station 1 then continues reception and transmission through downlink/uplink DPCH and scheduling of packet transmission. The base station 1 does not transmit or stops transmission of the state update data to the mobile station 2.

Additionally, if the base station 1 does not receive or stops reception of any ACK/NACK message in the current state update frame (step S5), the base station 1 transmits the state update data to the mobile station 2 at the next state update frame starting timing (step S2).

Further, if the base station 1 does not have any data to be transmitted to the mobile station 2 at the state update frame starting timing (step S1), the base station 1 transmits the suspend notice as the state update data. Further, the base station 1 does not carry out the communication with the mobile station 2 through downlink/uplink DPCH and the scheduling of packet transmission to the mobile station 2 (step S7) until the current state update frame ending timing (step S8).

(Operation of the Mobile Station)

Figure 6:
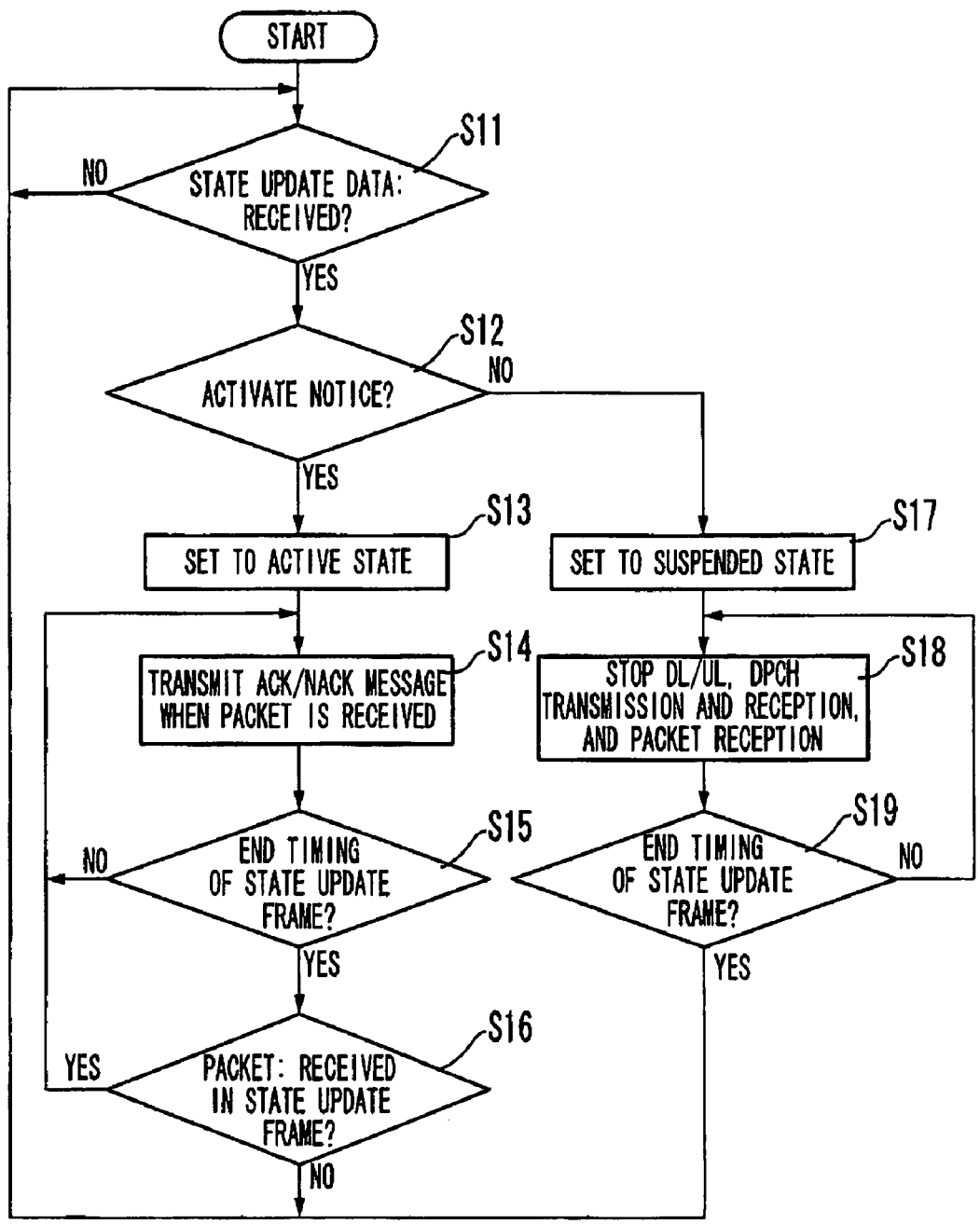
FIG. 6 is a flow chart showing an operation of the mobile station.
Figure 7:
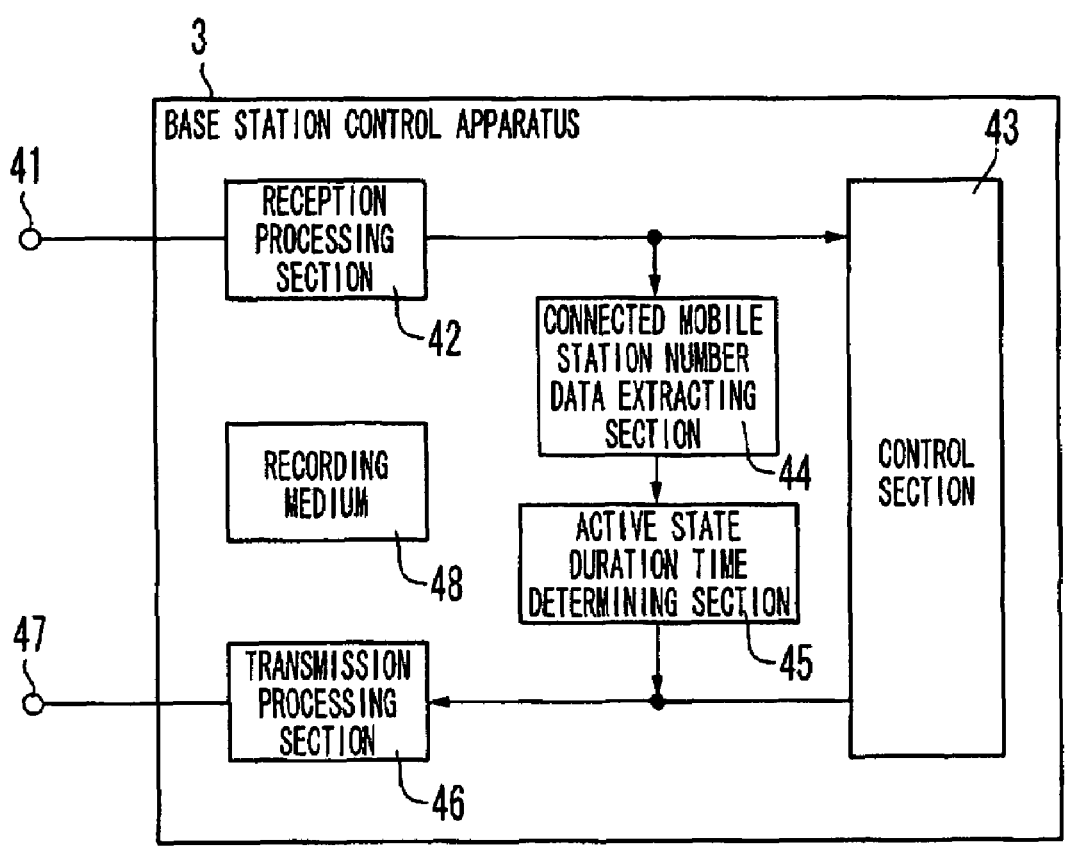
FIG. 7 is a block diagram showing a configuration of a base station control apparatus in a second embodiment of the present invention.

FIG. 6 is a flow chart showing an operation of the mobile station 2. It should be noted that the process shown in FIG. 6 is realized by the mobile station 2 executing a program stored in the recording medium 31.

The mobile station 2 receives the state update data transmitted at the beginning of the state update frame (step S11). When the state update data is the activate notice (step S12), the mobile station 2 is set to the active state in the current state update frame (step S13). As stated above, the active state is a state in which the communication with the base station 1 is carried out through downlink/uplink DPCH, HS-SCCH, and HS-DPCCH, and in which it is possible to carry the reception through HS-PDSCH based upon data on HS-SCCH.

If the mobile station 2 correctly receives a packet through HS-PDSCH, the mobile station 2 transmits the ACK/NACK message through HS-DPCCH to notify that the packet has been correctly received (step S14). The mobile station 2 continues this operation until the state update frame ending timing T1 (steps S14 and S15).

At the state update frame ending timing T1, the mobile station 2 determines whether or not the mobile station 2 has received any packet in the current state update frame (step S16). If the mobile station 2 has received the packet even once, the mobile station 2 is set to the active state in the next state update frame as well. If the mobile station 2 has not received any packet (step S16), the mobile station 2 returns to step S11 and receives the state update data transmitted at the beginning of the next state update frame.

Additionally, if the mobile station 2 receives the suspend notice in the state update data (step S12), the mobile station 2 is set to the suspended state (steps S17 and S18). Here, the suspended state is a state in which the communication through downlink/uplink DPCH, HS-SCCH, HS-PDSCH, and HS-DPCCH is suspended. The mobile station 2 keeps the suspended state until the state update frame is ended (steps S18 and S19).

(Summary and Supplementation)

A first advantage of the mobile communication system in the first embodiment described above is that power consumption of the mobile station 2 can be effectively reduced. This advantage results from a fact that the mobile station 2 is set to the suspended state when reception of a packet and transmission and reception of individual channel data are not carried out. By setting the mobile station 2 to the suspended state when communication is unnecessary, power consumption of the mobile station 2 can be effectively reduced. Especially, in packet communication, the data is transmitted in a burst manner so that a time period during which the data is not transmitted is long. Therefore, the power consumption of the mobile station 2 can be greatly reduced by suspending communication.

A second advantage is that resistance against a communication error of state update data is improved, resulting in reduction of a data delay and increase of throughput. In the mobile communication system, if a packet is transmitted or received when the mobile station 2 is set to the active state, the active state is unconditionally kept in the next state update frame. The mobile station 2 does not need reception of the state update data in order to keep the active state. The mobile communication system in the first embodiment does not need to set the mobile station 2 to the active state in response to the activate notice, even when packet transmission is carried out for a longer time than a state update frame. In other words, it is not necessary to receive the state update data to determine the state to which the mobile station 2 is to be set, as far as the mobile station 2 is once set to the active state and continues data communication. This reduces a possibility that the mobile station 2 is erroneously set to the suspended state due to a communication error of the state update data, which is effective for the reduction of data delay and the increase of throughput.

A third advantage is that there is less possibility that packet communication from the base station 1 to the mobile station 2 is unnecessarily carried out, resulting in the realization of effective utilization of system resources in the base station 1 and the increase in system throughput. This results from the fact that the mobile station 2 carries out the scheduling of packet transmission in the next state update frame when the base station 1 receives the ACK/NACK message to indicate that a packet has been correctly received by the mobile station 2. The base station 1 regards the mobile station 2 to be in the active state in the next state update frame and carries out the packet transmission, only when the base station 1 receives the ACK/NACK message. As a result, the possibility can be effectively reduced that the packet transmission is continued in the next state update frame as well by regarding the mobile station 2 to be in the active state though the mobile station 2 is actually set to the suspended state. Therefore, the mobile communication system in the first embodiment can reduce the possibility that the base station 1 unnecessarily carries out packet transmission, resulting in the effective utilization of system resources in the base station 1 and the increase in system throughput.

SECOND EMBODIMENT

In the second embodiment, a time period during which the mobile station 2 is in the active state (to be referred to as "active state duration time" hereinafter) is controlled by the base station control apparatus 3 in accordance with a load of the base station 1. More specifically, the active state duration time is controlled in accordance with the number of the mobile stations 2 connected to the base station 1. Configurations and operations of the base station 1, the mobile station 2, and the base station control apparatus 3 are changed for the control of the active state duration time. The operation of the mobile communication system will be described below after the configuration of the mobile communication system in the second embodiment has been described.

(Configuration of the Mobile Communication System)

The base station control apparatus 3 is configured to contain a receiving end 41 to which a signal is transmitted from the base station 1, a reception processing section 42 for processing the signal received from the base station 1, a control section 43 for carrying out various controls necessary for communication, a connected mobile station number data extracting section 44 for extracting the connected mobile station number data that indicates the number of mobile stations 2 connected to the base station 1, an active state duration time determining section 45, a transmission processing section 46 for carrying out processing of a signal transmitted to the base station 1, a transmitting end 47 from which the signal is transmitted to the base station 1, and a recording medium 48 that stores a program (a computer-executable program) for realizing processing of the respective sections in the base station control apparatus 3 (especially, the control section 43, the connected mobile station number data extracting section 44, and the active state duration time determining section 45).

The active state duration time determining section 45 determines that the active state duration time is T_Long if the number of mobile stations shown by the connected mobile station number data is larger than a predetermined threshold. The time period T_Long is longer than the length of a state update frame. Specifically, the time period T_Long is a time period that is $n_1$ times longer than the length of the state update frame. Here, $n_1$ is an integer number of 3 or above. On the other hand, when the number of mobile stations shown by the connected mobile station number data is lower than the predetermined threshold, the active state duration time determining section 45 determines that the active state duration time is T_Short. Here, the time period T_Short is shorter than the time period T_Long, and is longer than the length of the state update frame. Specifically, the time period T_Short is a time period that is $n_2$ times longer than the length of the state update frame. Here, $n_2$ is an integer number of 2 or above, and smaller than $n_1$. The determined active state duration time is transmitted to the base station 1 by the transmission processing section 46.

Figure 8:
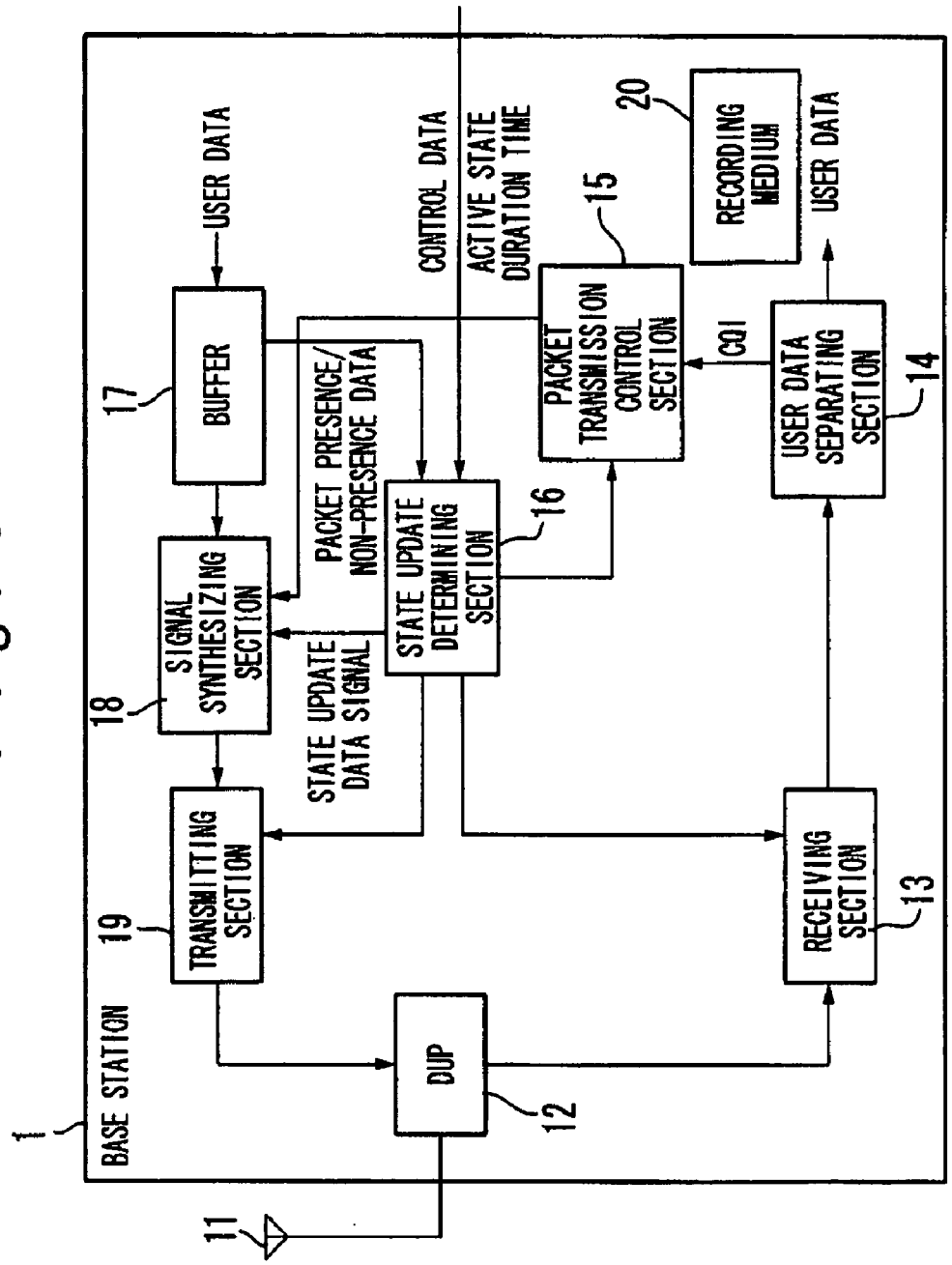
FIG. 8 is a block diagram showing a configuration of the base station in the second embodiment.

FIG. 8 is a block diagram showing a configuration of the base station 1 in the second embodiment. In the second embodiment, the base station 1 has the same configuration as the base station 1 shown in FIG. 2, with the exception that the base station 1 receives the active state duration time from the base station control apparatus 3 instead of receiving the ACK/NACK message from the user data separating section 14. If the active state duration time is notified from the base station control apparatus 3, the state update determining section 16 determines the state of the mobile station 2 based upon the notified active state duration time. The operation of the other sections in the base station 1 in the second embodiment is the same as that of the first embodiment.

Figure 9:
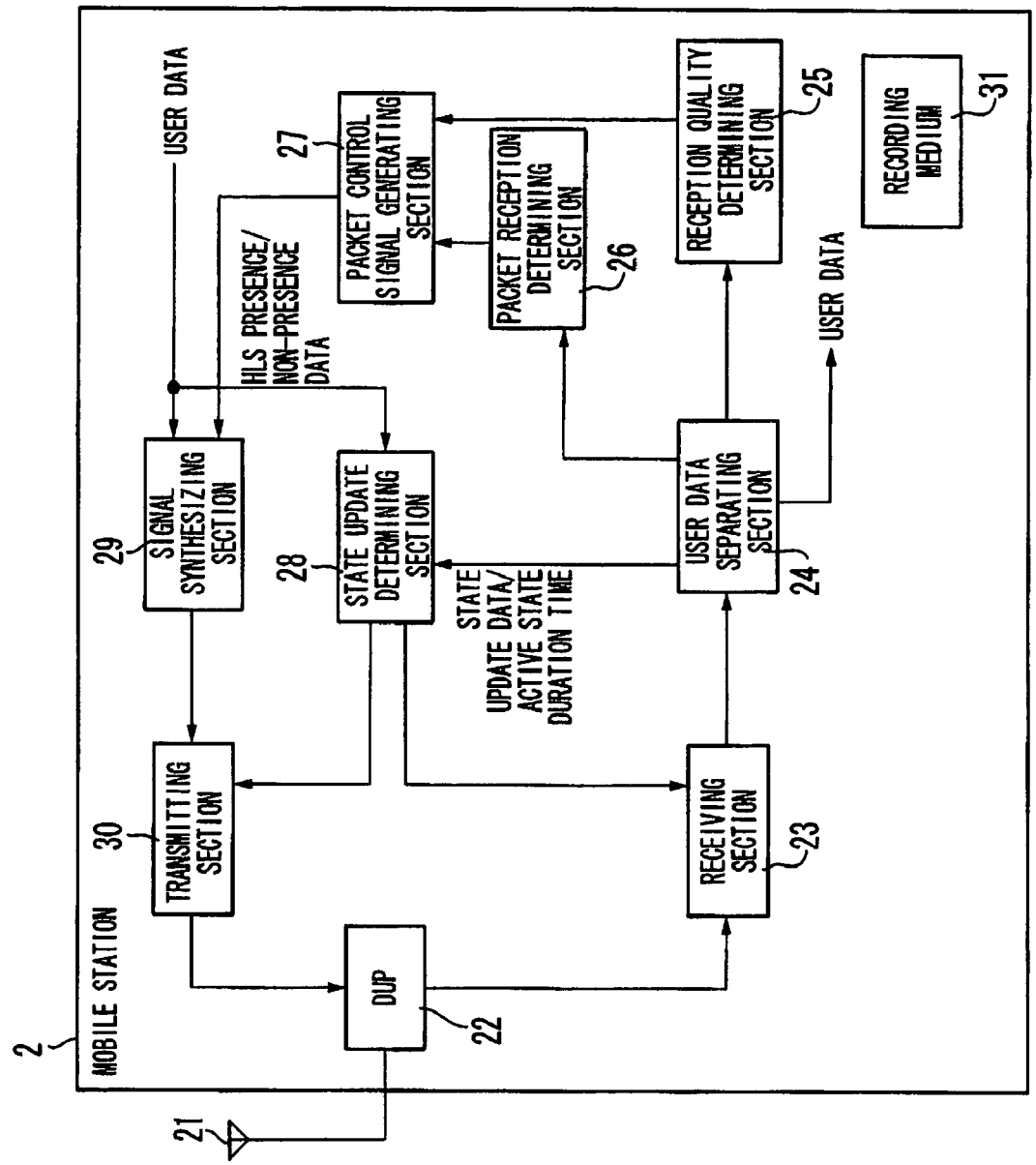
FIG. 9 is a block diagram showing a configuration of the mobile station in the second embodiment.

FIG. 9 is a block diagram showing a configuration of the mobile station 2 in the second embodiment. In the second embodiment, the mobile station 2 has the same configuration as the mobile station 2 in FIG. 3, with the exception that the state update determining section 28 receives the active state duration time from the user data separating section 24 instead of receiving a notice indicative of presence or absence of packet reception from the packet reception determining section 26. The operation of the other sections in the mobile station 2 in the second embodiment is the same as that of the first embodiment. If the active state duration time is notified from the user data separating section 24, the state update determining section 28 determines the state of the mobile station 2 based upon the notified active state duration time.

(Operation of the Mobile Communication System)

Figure 10:
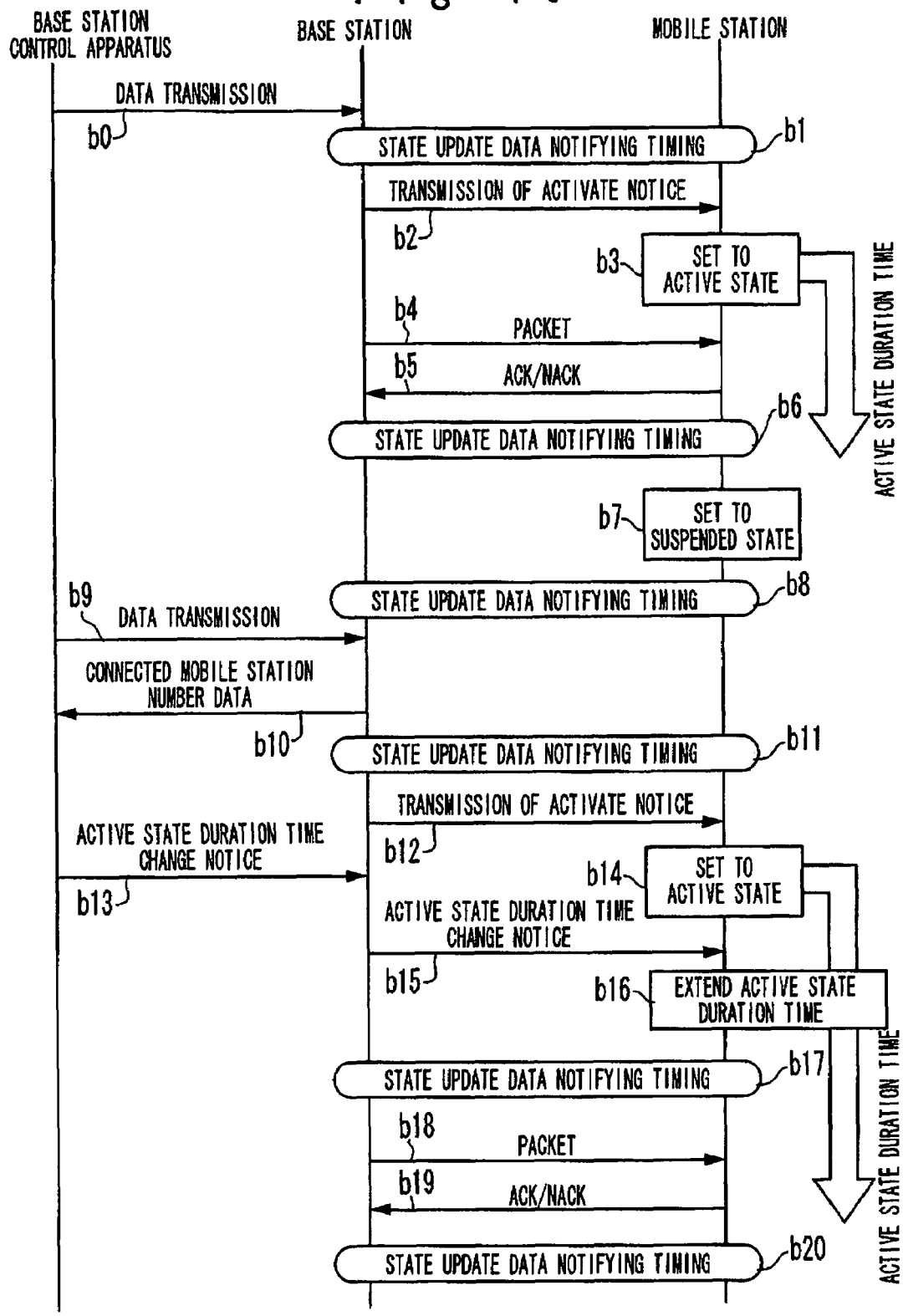
FIG. 10 is a sequence chart showing an operation of the mobile communication system in the second embodiment of the present invention.

FIG. 10 is a sequence chart showing an operation of the mobile communication system in the second embodiment of the present invention. The active state duration time is initially set in the state update determining section 28 in the mobile station 2. The base station 1 retains the active state duration time in the state update determining section 16, the active state duration time having been set in the state update determining section 28 in the mobile station 2.

If a data to be transmitted to the mobile station 2 is generated, the base station control apparatus 3 transfers the data to the base station 1 (step b0). The base station 1 determines whether or not there is any data to be transmitted to the mobile station 2 at the state update data notifying timing in the beginning of the state update frame (step b1). When there is the data to be transmitted to the mobile station 2, the base station 1 transmits the activate notice as the state update data to the mobile station 2 (step b2). In response to the activate notice, the mobile station 2 is set to the active state and starts communication with the base station 1 through downlink/uplink DPCH, HS-SCCH, HS-PDSCH, and HS-DPCCH (step b3). The mobile station keeps the active state during the active state duration time irrespective of the state update data, after having been set to the active state.

The base station 1 suspends the transmission of the state update data to the mobile station 2 during the active state duration time after transmitting the activate notice to the mobile station 2. In other words, after being transmitted the activate notice, the base station 1 carries out the scheduling of packet transmission to the mobile station 2 and transmits desired packets during the active state duration time (step b4). In the current state update frame, if the mobile station 2 correctly receives a packet via HS-PDSCH (step b4), the mobile station 2 transmits the ACK/NACK message to indicate that the packet has been correctly received (step b5), and keeps the active state in the next state update frame as well (step b6).

Additionally, if nothing has been notified at all after the active state duration time (step b6), the mobile station 2 at the next state update data notifying timing is set to the suspended state (step b7).

Further, the base station 1 counts the number of mobile stations 2 connected to the base station 1 (namely, the number of mobile stations 2 in the communication state). The base station 1 notifies the base station control apparatus 3 of the connected mobile station number data to indicate the number of connected mobile stations 2 at a predetermined time period, or when the number of connected mobile stations 2 exceeds a predetermined threshold (step b10). The base station control apparatus 3 determines the active state duration time based on the connected mobile station number data transmitted from the base station 1, and notifies the base station 1 of the active state duration time change notice to instruct the active state duration time to be set (step b13).

If receiving the active state duration time change notice from the base station control apparatus 3, the base station 1 updates the active state duration time to be retained in the state update determining section 16 to an active state duration time shown in the active state duration time change notice. The base station 1 thereafter carries out transmission of the state update data based on the updated active state duration time.

In addition, the base station 1 transmits the active state duration time change notice to instruct change of the active state duration time to the mobile station 2 (step b15). When receiving the active state duration change notice, the mobile station 2 changes the active state duration time retained in the state update determining section 28 to the active state duration time specified in the active state duration change notice (step b16). The mobile station 2 thereafter determines the state to be set based on the updated active state duration time.

Figure 11:
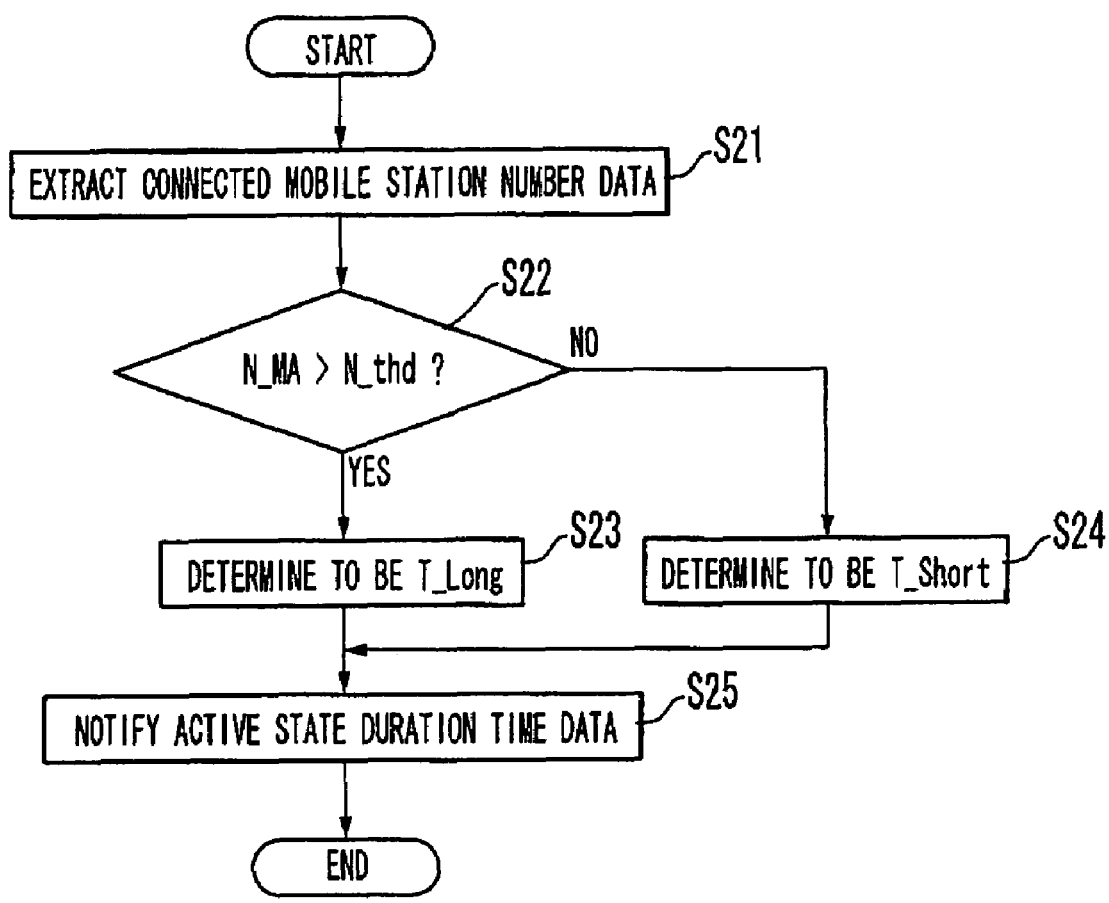
FIG. 11 is a flow chart showing an operation of the base station control apparatus in the second embodiment.

FIG. 11 is a flow chart showing an operation when the base station control apparatus 3 determines the active state duration time in response to the connected mobile station number data. As described above, the connected mobile station number data is transmitted to the base station control apparatus 3 in the predetermined time period, or when the number of mobile stations 2 connected to the base station 1 exceeds the predetermined threshold. The process shown in FIG. 11 is realized by the base station control apparatus 3 executing the program stored in the recording medium 48.

The base station control apparatus 3 extracts the connected mobile station number data from a reception signal received from the base station 1 (step s21). Further, the base station control apparatus 3 compares the number of mobile stations 2 N_MS shown in the connected mobile station number data with a predetermined threshold N_Thd (step s22). Then, the base station control apparatus 3 determines that the active state duration time is T_Long when the number N_MS is larger than the threshold N_Thd (step s23). Otherwise, the base station control apparatus 3 determines that the active state duration time is T_Short (step s24). Subsequently, the base station control apparatus 3 notifies the base station 1 of the determined active state duration time (step S25).

Figure 12:
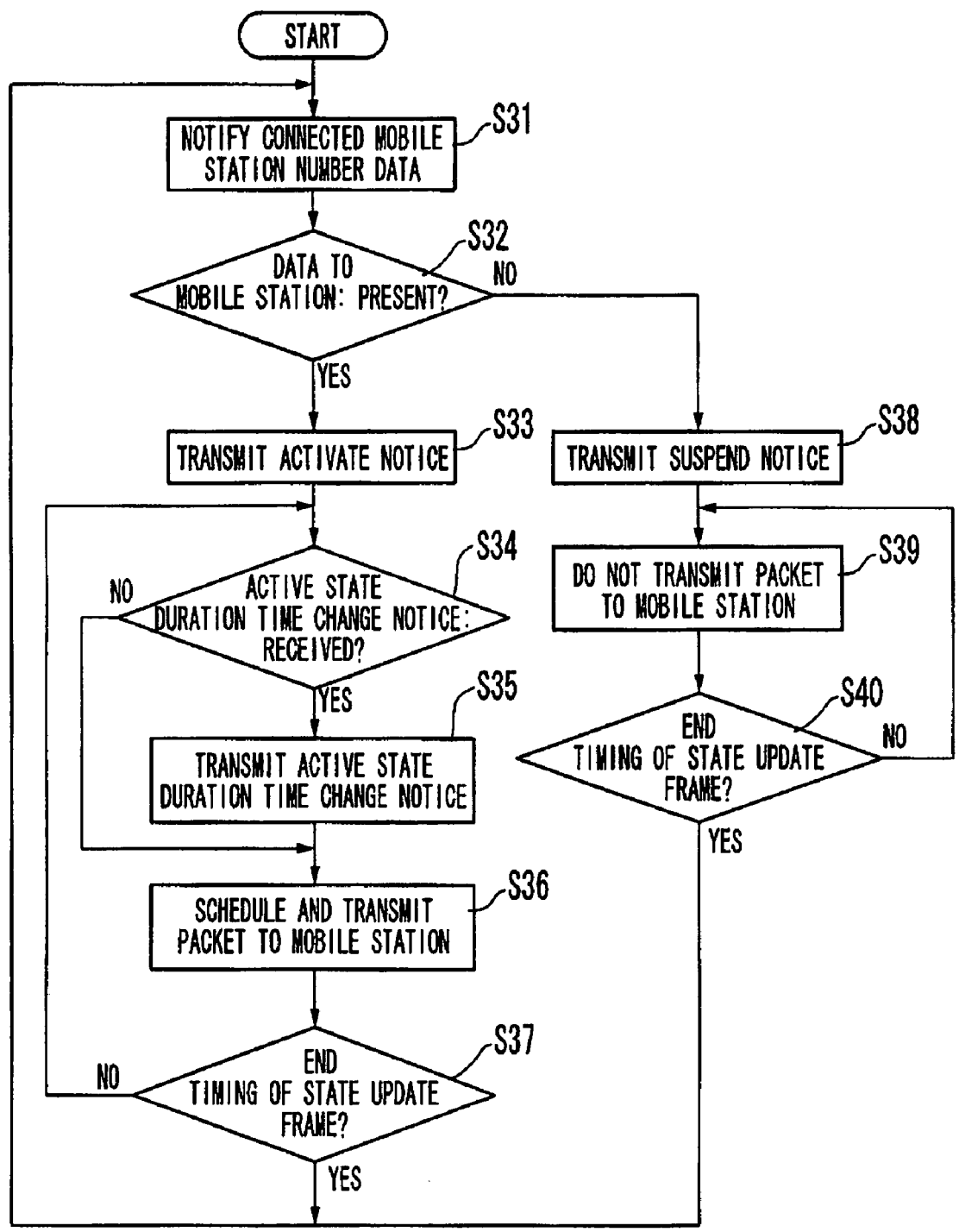
FIG. 12 is a flow chart showing an operation of the base station in the second embodiment.

FIG. 12 is a flow chart showing an operation of the base station 1 in the second embodiment. The process shown in FIG. 12 is realized by the base station 1 executing the program stored in the recording medium 20.

The base station 1 counts the number of mobile station 2 connected to the base station 1 through radio channels in a predetermined time period. The base station 1 notifies the base station control apparatus 3 of the connected mobile station number data to indicate the number of connected mobile stations 2 in the predetermined time period or when the number of the connected mobile stations 2 exceeds the predetermined threshold (step S31).

When there is any data to be transmitted to the mobile station 2 (step S32), the base station 1 transmits the activate notice as the state update data to the mobile station 2 (step S33).

Further, if the base station 1 receives the active state duration time change notice from the base station control apparatus 3 (step S34), the base station 1 changes the active state duration time retained in the state update determining section 16, and transmits the active state duration time change notice to the mobile station 2 (step S35).

After that, the base station 1 carries out the communication with the mobile station 2 through downlink/uplink DPCH, and the scheduling of packet transmission to the mobile station 2 (step S36). The base station 1 repeatedly carries out the above-mentioned processes in predetermined time period until the active state duration time T2 is ended (steps S34 to S37). The control operation of the base station 1 returns to step S31 if the active state duration time T2 is ended.

On the other hand, when there is no data for the mobile station 2 at the state update frame starting timing (step S32), the base station 1 transmits the suspend notice as the state update data (step S38). The base station 1 does not carry out the communication with the mobile station 2 through downlink/uplink DPCH, and the scheduling of packet transmission to the mobile station 2 (step S39) until the current state update frame ending timing (step S40).

Figure 13:
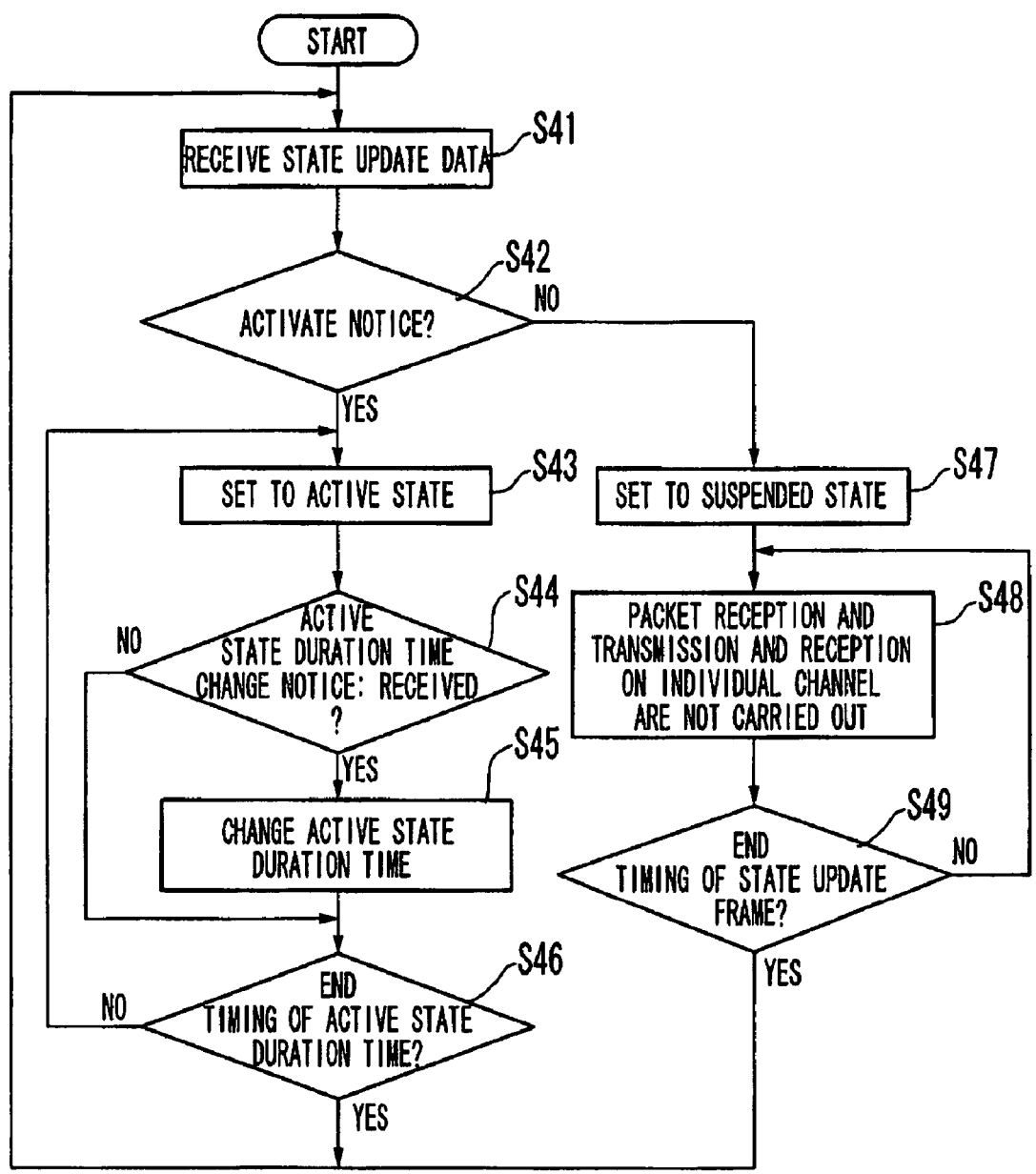
FIG. 13 is a flow chart showing an operation of the mobile station in the second embodiment.

FIG. 13 is a flow chart showing an operation of the mobile station 2 in the second embodiment. The process shown in FIG. 13 is realized by the mobile station 2 executing the program stored in the recording medium 31.

The mobile station 2 receives the state update data at the beginning of the state update frame (step S41). When the received state update data is the activate notice (step S42), the mobile station 2 is set to the active state (step S43). As described above, the active state is a state that the communication through downlink/uplink DPCH, HS-SCCH, and HS-DPCCH can be carried out and data received through HS-PDSCH can be received based on data received through HS-SCCH.

Further, if the mobile station 2 receives the active state duration time change notice from the base station 1 (step S44), the mobile station 2 updates the active state duration time to the notified data (step S45). The mobile station 2 continues this operation in the predetermined time period until the active state duration time is ended (steps S43 to S46). The mobile station 2 does not receive or stops reception of the state update data until the active state duration time is ended. The mobile station 2 then receives the state update data transmitted at the beginning of the next state update frame (step S41) after the active state duration time is ended.

The mobile station 2 is set to the suspended state (steps S47 and S48) when the received state update data is the suspend notice (step S42). As described above, the suspended state is a state that the communication through downlink/uplink DPCH, HS-SCCH, and HS-DPCCH is suspended.

The mobile station 2 keeps the suspended state until the state update frame is ended (step S49). The control of the mobile station 2 returns to a step S41 at the state update frame ending timing, and the mobile station 2 receive the state update data at the beginning of the next state update frame.

(Summary and Supplementation)

The mobile communication system in the second embodiment has the similar advantages as those of the mobile communication system in the first embodiment. As in the first embodiment, the mobile communication system in the second embodiment can reduce power consumption of the mobile station 2, improve resistance to communication errors of the state update data, and reduce the possibility of unnecessary packet transmission from the base station 1 to the mobile station 2.

Also, the mobile communication system in the second embodiment can control a load of a downlink in accordance with a load applied to the base station 1. When the number of mobile stations 2 connected to the base station 1 is large, that is, when the load applied to the base station 1 is large, the active state duration time is made longer. Consequently, the number of transmission of the state update data is reduced, and the load of the downlink can be lowered. Thus, the possibility that the base station 1 is overloaded can be effectively reduced.

In addition, in the second embodiment, it is possible that an amount of data transmitted from the base station 1 to the mobile station 2 may be used as an indicator of the load applied to the base station 1, instead of the number of mobile stations 2 connected to the base station 1. When the amount of data to be transmitted to the mobile station 2 is large, the active state duration time is made longer. Thus, the possibility that the base station 1 is overloaded can be reduced.

THIRD EMBODIMENT

In the third embodiment, the active state duration time is controlled in response to a maximum transmission rate between the base station 1 and the mobile station 2, instead of the number of mobile stations 2 connected to the base station 1. When the maximum transmission rate is lower, the active state duration time is made longer. This is because there is a higher possibility that a transmission time necessary to transmit data to the mobile station 2 is made longer as the maximum transmission rate is lowered.

Figure 14:
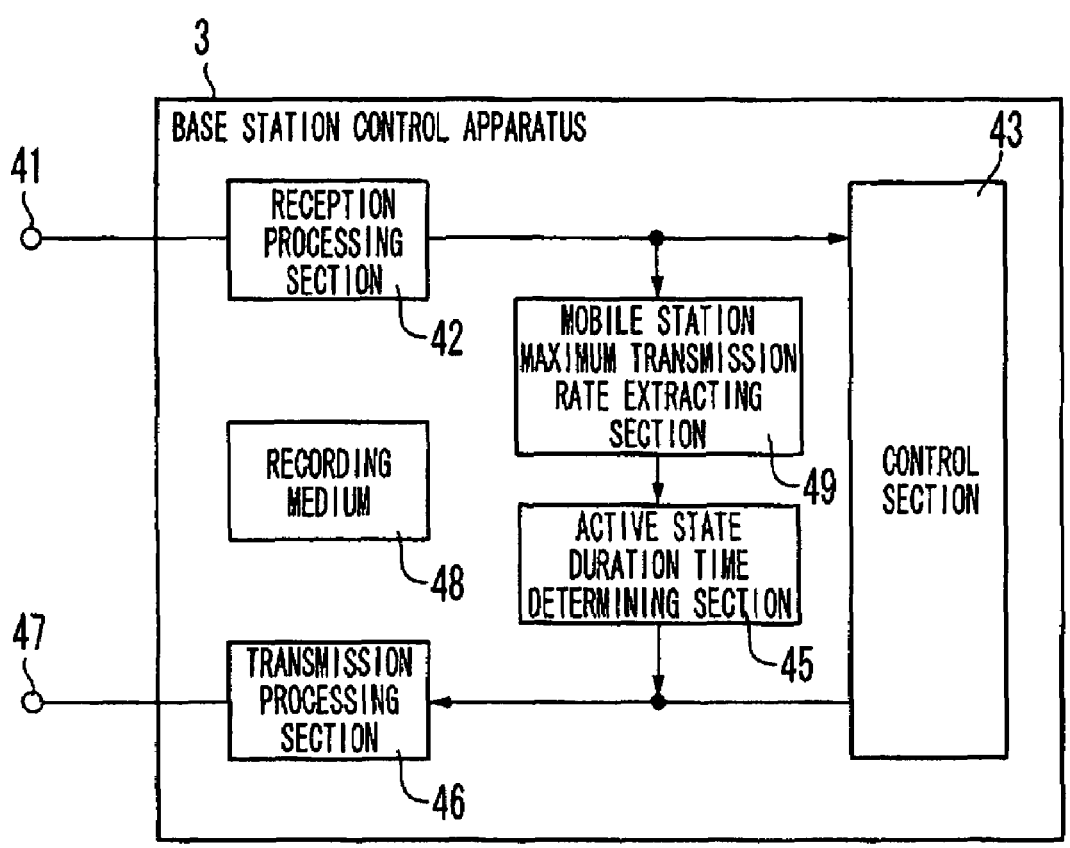
FIG. 14 is a block diagram showing the base station control apparatus in a third embodiment of the present invention.

As shown in FIG. 14, the base station control apparatus 3 is provided with a mobile station maximum transmission rate data extracting section 49 instead of the connected mobile station number data extracting section 44, for control of the active state duration time based on the maximum data rate. The mobile station maximum transmission rate data extracting section 49 extracts the maximum transmission rate in communication between the base station 1 and the mobile station 2 from a signal notified from the base station 1, and notifies the active state duration time determining section 45 of the extracted maximum transmission rate. The active state duration time determining section 45 determines that the active state duration time is T_Long based upon the maximum transmission rate when the extracted maximum transmission rate is lower than a predetermined threshold. Otherwise, the active state duration time determining section 45 determines that the active state duration time is T_Short that is shorter than the time T_Long. The determined active state duration time is transmitted to the base station 1 as the active state duration time change notice. The other sections of the base station control apparatus 3, and the configurations and operations of the base station 1 and mobile station 2 are the same as those in the second embodiment. Therefore, the configurations and operations of the base station 1 and mobile station 2 are not described.

Figure 15:
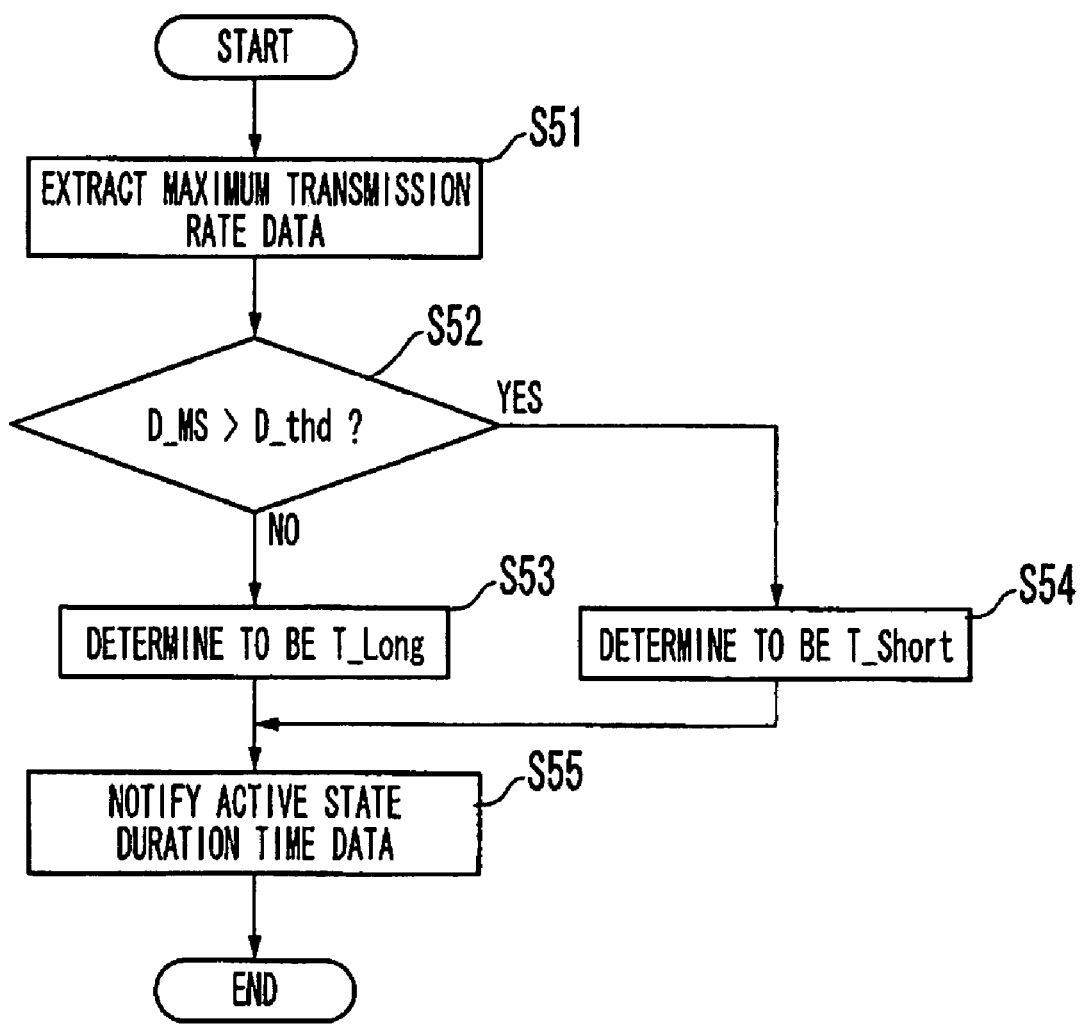
FIG. 15 is a flow chart showing an operation of the base station control apparatus in a fourth embodiment of the present invention.

FIG. 15 is a flow chart showing an operation of the base station control apparatus 3. The process shown in FIG. 15 is realized by the base station control apparatus 33 executing the program in the recording medium 48.

The base station control apparatus 3 extracts the maximum transmission rate of the mobile station 2 from a signal received from the base station 1 (step S51). The base station control apparatus 3 compares the extracted maximum transmission rate D_MS with the predetermined threshold D_Thd (step S52). The base station control apparatus 3 determines that the active state duration time is T_Short when the maximum transmission rate D_MS is larger than the threshold D_Thd (step S54). When the maximum transmission rate D_MS is smaller than the threshold D_Thd, the base station control apparatus 3 determines that the active state duration time is T_Long when MS<D_Thd (step S53). The base station control apparatus 3 notifies the base station 1 of the determined active state duration time (step S55).

In the third embodiment as described above, the active state duration time is controlled in response to the maximum transmission rate received by the mobile station 2. In general, it is likely that when the maximum transmission rate of the mobile station 2 is lower, the longer time is required to complete transmission, even for the same amount of data. Therefore, the active state needs to be kept for a longer time. The mobile communication system in the third embodiment can set a longer active state duration time for such a mobile station 2. Consequently, the mobile communication system in the third embodiment can reduce the number of times when the base station 1 transmits the state update data, and can effectively utilize a downlink.

In addition, in the mobile communication system in the third embodiment, resistance to communication errors of the state update data is improved since the number of times when the state update data is communicated is decreased. This is preferable because a probability of the mobile station 2 erroneously set to the suspended state due to reception errors of the activate notice can be reduced, and a transmission delay of a packet can be reduced.

FOURTH EMBODIMENT

In the fourth embodiment, the active state duration time is controlled based on a service mode provided to the mobile station 2. In the fourth embodiment, when data in the service mode is transmitted in a burst manner, the active state duration time is set shorter. This is because the data transmission time is likely to become shorter as the data transmission in the service mode is carried out in the burst manner.

Figure 16:
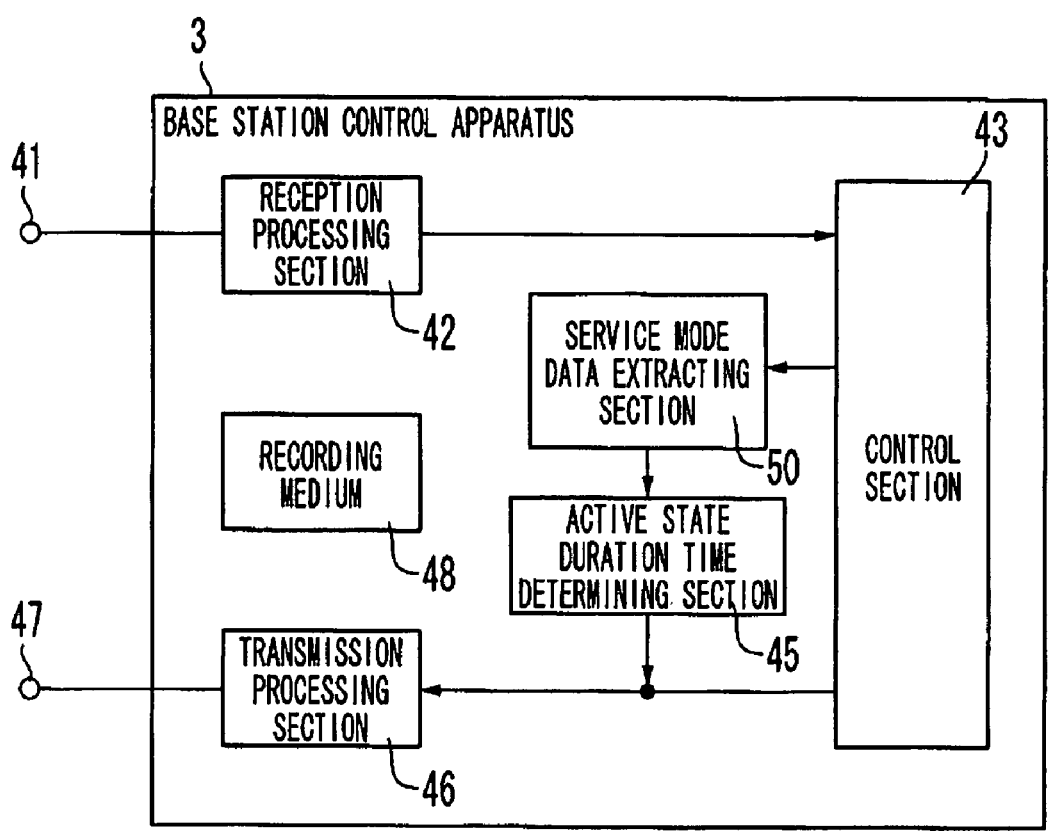
FIG. 16 is a block diagram showing the base station control apparatus in the fourth embodiment of the present invention.

As shown in FIG. 16, the base station control apparatus 3 in the fourth embodiment is provided with a service mode data extracting section 50 instead of the connected mobile station number data extracting section 44 in the second embodiment for the control of the active state duration time based on the maximum data rate. The service mode data extracting section 50 extracts a service mode data indicating the service mode of the mobile station 2 informed from a network (not shown) to the base station control apparatus 3, and notifies the active state duration time determining section 45 of the service mode data. Based upon the service mode data, the active state duration time determining section 45 determines that the active state duration time is T_Long when data for the service is a lower burst manner and that the active state duration time is T_Short that is shorter than the time T_Long when data for the service is a higher burst manner. The configurations of the other sections in the base station control apparatus 3 in the fourth embodiment are the same as those in the base station control apparatus 3 in the second embodiment.

Configurations of the base station 1 and the mobile station 2 in the embodiment are the same as those in the second embodiment of the present invention.

Figure 17:
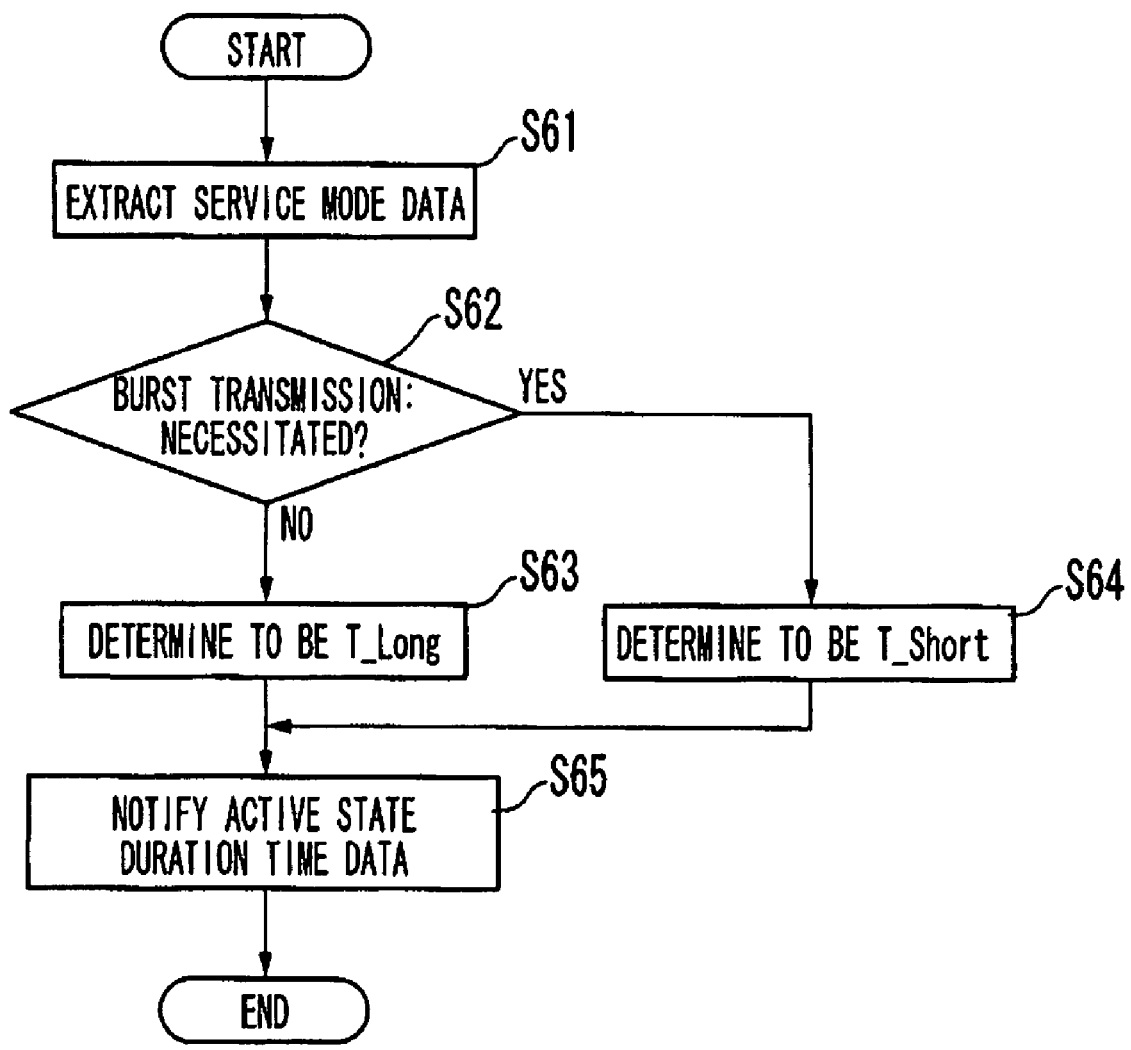
FIG. 17 is a flow chart showing an operation of the base station control apparatus in the fourth embodiment.
Figure 18:
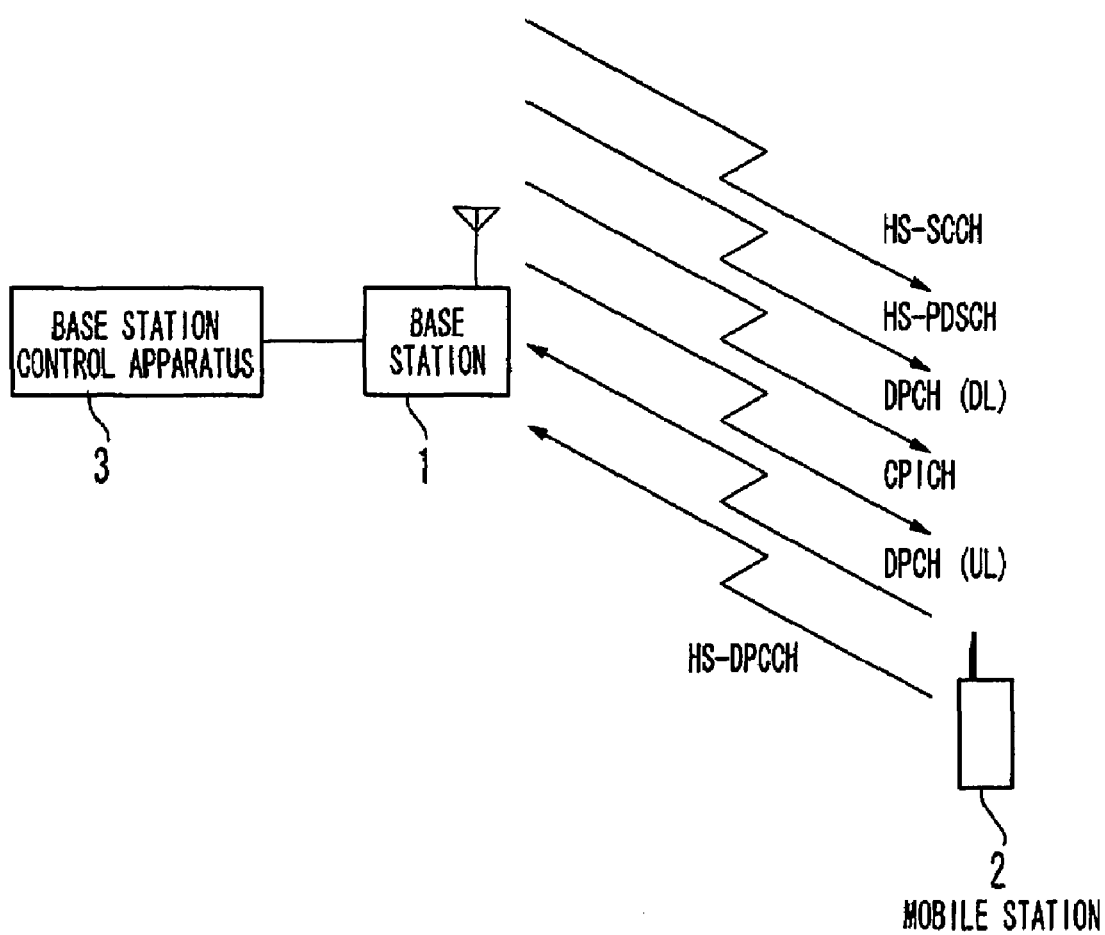
FIG. 18 is a block diagram showing a conventional mobile communication system.

FIG. 17 is a flow chart showing an operation of the base station control apparatus 3 in the fourth embodiment. The process shown in FIG. 4 is realized by the base station control apparatus 3 executing the program in the recording medium 48.

The base station control apparatus 3 extracts data of the service mode for the mobile station 2 from a signal transmitted from a network (step S61), and determines whether the service mode necessitates a higher burst transmission (step S62).

If the base station control apparatus 3 determines that the service mode necessitates the higher burst transmission, the base station control apparatus 3 determines that the active state duration time is T_Long (step S63). When determining that the service mode does not necessitate the higher burst transmission, the base station control apparatus 3 determines that the active state duration time is T_Short (step S64). The base station control apparatus 3 notifies the base station 1 of the determined active state duration time (step S65);

In the fourth embodiment, whether the service for the mobile station 2 necessitates the higher burst transmission is used as an indicator for controlling the active state duration time. In general, when the higher burst transmission is not necessitated for the service even if a same amount of data is transmitted, there is a possibility that the time necessary to transmit the data becomes longer. Therefore, it is needed to continue the active state longer In the mobile communication system in the fourth embodiment, the number of times when the base station 1 transmits the state update data can be reduced, since the active state duration time of the mobile station 2 which receives the service of higher burst transmission can be set longer. This is advantageous in that a downlink can be effectively utilized.

Additionally, in the mobile communication system in the embodiment, resistance to communication errors of the state update data is improved since the number of times when the state update data is communicated is decreased. This is preferable because a probability of the mobile station 2 erroneously set to the suspended state due to reception errors of the activate notice can be reduced, and a transmission delay of a packet can be reduced.

It should be noted that the present invention is not limited to the first to the fourth embodiments as described above. For example, the mobile station 2 may be set to the suspended state in the next state update frame even when the mobile station 2 correctly receives a packet in a certain state update frame, if the mobile station 2 receives the suspend notice at the following state update data notifying timing. Also, the mobile station 2 may be set to the suspended state in the next state update frame even before the active state duration time is ended, if the mobile station 2 receives the suspend notice at the state update data notifying timing.

Also, the present invention is not limited to the HSDPA service as described above, and may be applied to packet transmission transmitted on an individual channel and the control of an individual channel in transmission of control data for an upper layer.

Further, the base station control apparatus 3 may be set in the base station 1 or in another place to carry out control of a plurality of base stations 1. Moreover, when a plurality of mobile stations 2 exist, a different active state duration time may be set for each mobile station 2. The active state duration time change notice may be transmitted in a given time of the active state.

As described above, the present invention can reduce power consumption of the mobile station in a waiting time during packet transmission and transmission of control data. The data is transmitted in a burst transmission, especially, in packet communication so that a time during which data is not transmitted is long. Therefore, it is of great advantage to reduce power consumption of the mobile station by suspending transmission and reception.

Additionally, in the mobile communication system in the present invention, it is not necessary to determine the state by receiving the state update data, after the active state is set once. Therefore, it is possible to avoid the mobile station from being set to the suspended state caused by reception errors of the state update data. Consequently, the mobile communication system in the present invention can reduce a delay in data transmission and increase throughput.

The invention claimed is:

1. A mobile communication system comprising:
a base station; and
a mobile station configured to communicate with said base station,
wherein a plurality of state update frames are defined in a time domain in a communication protocol between said base station and said mobile station,
said base station can transmit a state update data in each of said plurality of state update frames to instruct which of an active state and a suspended state said mobile station should be set to, and transmits a packet only to said mobile station which has been set to said active state based on said state update data,
said base station pre-announces transmission of said packet to said mobile station earlier by a predetermined time period than the transmission of said packet by transmitting a control data containing data necessary to receive said packet, and
said mobile station is set to one of said active state and said suspended state in response to said state update data, can receive said control data and said packet when said mobile station has been set to said active state, and cannot receive said control data and said packet when said mobile station has been set to said suspended state.

2. The mobile communication system according to claim 1, wherein when said mobile station receives said packet from said base station correctly in a first state update frame of said plurality of state update frames, said mobile station is set to said active state in a second state update frame subsequent to said first state update frame regardless of said state update data.

3. The mobile communication system according to claim 2, wherein if said mobile station receives said packet from said base station correctly, said mobile station transmits a delivery confirmation data to said base station to notify a correct reception of said packet, and
said base station stops transmission of said state update data in said second state update frame based on receiving said delivery confirmation data.

4. The mobile communication system according to claim 1, wherein the state update data comprises an activate notice corresponding to said active state, and wherein said mobile station continues said active state during an active state duration time which begins from a time when said activate notice is received, regardless of said state update data, and set to said suspended state when said active state duration time ends, wherein
said active state duration time is longer than a time length of said plurality of state update frames.

5. The mobile communication system according to claim 4, wherein said base station stops the transmission of said state update data to said mobile station during said active state duration time.

6. The mobile communication system according to claim 4, wherein said active state duration time is determined based on a load of said base station.

7. The mobile communication system according to claim 4, wherein said active state duration time is determined based on a number of mobile stations connected with said base station.

8. The mobile communication system according to claim 4, wherein said active state duration time is determined based on a maximum transmission rate between said mobile station and said base station.

9. The mobile communication system according to claim 4, wherein said active state duration time is determined based on a service mode provided for said mobile station.

10. A base station which communicates a mobile station based on a communication protocol in which a plurality of state update frames are defined in a time domain, comprising:
   state update data generating means configured to generate a state update data which is used to set said mobile station to one of an active state in which said mobile station can communicate with said base station, and a suspended state in which said mobile station cannot communicate with said base station;
   control data generating means configured to generate a control data containing a data necessary for said mobile station which has been set to said active state to receive a packet to be transmitted from said base station to said mobile station which has been set to said active state; and
   transmitting means configured to transmit said state update data to said mobile station in each of said plurality of state update frames, and to previously announce a transmission of said packet to said mobile station by transmitting said control data
   containing the data necessary to receive said packet earlier by a predetermined time period than the transmission of said packet.

11. The base station according to claim 10, wherein when said transmitting means receives a delivery confirmation data from said mobile station to indicate correct reception of said packet in the first state update frame of said plurality of state update frames, said transmitting means stops transmission of said state update data to said mobile station in a second state update frame subsequent to said first state update frame.

12. The base station according to claim 10, wherein the state update data comprises an activate notice to set said mobile station to said active state, and wherein said transmitting means stops the transmission of said state update data during an active state duration time which begins from a time when said activate notice is transmitted.

13. A mobile station which communicates with a base station based on a communication protocol in which a plurality of state update frames are defined in a time domain, comprising: receiving means configured to receive a state update data from said base station in each of a plurality of state update frames; and
   setting means configured to set said mobile station to one of an active state in which said mobile station can communicate with said base station and a suspended state about in which said mobile station cannot communicate with said base station.

14. The mobile station according to claim 13, wherein when said receiving means receives a packet from said base station correctly in a first state update frame of said plurality of state update frames, said setting means sets said mobile station to said active state in a second state update frame subsequent to said first state update frame regardless of said state update data.

15. The mobile station according to claim 13, wherein the state update data comprises an activate notice corresponding to said active state, and wherein
   said setting means sets said mobile station to said active state during an active state duration time which begins from a time when said activate notice is received, regardless of said state update data, and sets said mobile station to said suspended state when said active state duration time ends, wherein
   said active state duration time is longer than a time length of said plurality of state update frames.

16. A base station control apparatus for a mobile communication system in which a base station and a mobile station communicate based on a communication protocol in which a plurality of state update frames are defined in time domain, said base station can transmit a state update data in each of said plurality of state update frames, and said mobile station is set to one of an active state, in which said mobile station can communicate with said base station and a suspended state in which said mobile station cannot communicate with said base station, in response to said state update data, comprising:
   generating means configured to generate an active state duration time change notice to instruct a length of an active state duration time which is started when said mobile station receives an activate notice to set said mobile station to said active state, and during which said mobile station is set to said active state in response to said activate notice; and
   transmitting means configured to transmit said active state duration time change notice to said base station,
   wherein said active state duration time is longer than a time length of said plurality of state update frames.

17. The base station control apparatus according to claim 16, wherein said generating means determines said active state duration time based on a load of said base station.

18. The base station control apparatus according to claim 16, wherein said generating means determines said active state duration time based on a number of said mobile stations connected with said base station.

19. The base station control apparatus according to claim 16, wherein said generating means determines said active state duration time based on a maximum transmission rate between said mobile station and said base station.

20. The base station control apparatus according to claim 16, wherein said generating means determines said active state duration time based on a service mode which is provided for said mobile station.

21. A radio communication method of communicating between a base station and a mobile station by using a communication protocol in which a plurality of state update frames are defined in a time domain, comprising:
   (a) transmitting a state update data from said base station to said mobile station to instruct which of an active state and a suspended state said mobile station should be set to in a first state update frame of said plurality of state update frames;
   (b) transmitting a control data, which contains a data necessary for said mobile station which has been set to said active state to receive a packet to be transmitted from said base station to said mobile station which has been set to said active state, as a previous transmission announcement to said mobile station which has been set to said active state in said first state update frame;
   (c) transmitting said packet to said mobile station which has been set to said active state; and
   (d) setting said mobile station to one of said active state and said suspended state in response to said state update data during said first state update frames,
   wherein said mobile station receives said control data and said packet when said mobile station is set to said active state, and does not to receive or stops reception of said control data and said packet when said mobile station is set to said suspended state.

22. The radio communication method according to claim 21, further comprising:
   when said mobile station receives said packet from said base station correctly in said first state update frame, setting said mobile station to said active state in a second state update frame subsequent to said first state update frame regardless of said state update data.

23. The radio communication method according to claim 22, further comprising:
if said mobile station receives said packet from said base station correctly, transmitting a delivery confirmation data from said mobile station to said base station to notify that said mobile station received said packet correctly,
receiving the delivery confirmation data by said base station, and
terminating the transmission of said state update data to said mobile station in said second state update frame based on the received delivery confirmation data.

24. The radio communication method according to claim 21, wherein the state update data comprises an activate notice corresponding to said active state, and wherein said mobile station keeps said active state during an active state duration time which begins from a time when said activate notice is received, regardless of said state update data, and set to said suspended state when said active state duration time ends, wherein said active state duration time is longer than a time length of said plurality of state update frames.

25. The radio communication method according to claim 24, further comprising:
terminating the transmission of said state update data to said mobile station during said active state duration time.

26. The radio communication method according to claim 24, further comprising:
determining said active state duration time based on said base station load.

27. The radio communication method according to claim 24, further comprising:
determining said active state duration time based on a number of said mobile stations connected with said base station.

28. The radio communication method according to claim 24, further comprising:
determining said active state duration time based on a maximum transmission rate between said mobile station and said base station.

29. The radio communication method according to claim 24, further comprising:
determining said active state duration time based on a service form provided for said mobile station.

30. A computer-readable recording medium storing a computer program product for operating a base station which communicates with a mobile station based on a communication protocol in which a plurality of state update frames are defined in a time domain, the computer program product comprising:
a program code to transmit a state update data to said mobile station to set said mobile station to one of an active state in which said mobile station can communicate with said base station and a suspended state in which said mobile station cannot communicate with said base station, in each of said plurality of state update frames.

31. The medium according to claim 30, wherein said program code operates said base station not to transmit said state update data for setting said mobile station to one of said active state and said suspended state in a second state update frame subsequent to a first state update frame, when said base station receives a delivery confirmation data from said mobile station to notify correct reception of said packet in said first state update frame of said plurality of state update frames.

32. The medium according to claim 30, wherein said program code operates said base station to transmit said state update data for setting said mobile station to one of said active state and said suspended state in said second state update frame subsequent to said first state update frame, when said base station does not receive said delivery confirmation data from said mobile station to notify correct reception of said packet in said first state update frame of said plurality of state update frames.

33. A computer-readable recording medium storing a computer program product to operate a mobile station which communicates with a base station based on a communication protocol in which a plurality of state update frames are defined in a time domain, the computer program product comprising:
a first program code to receive a state update data from said base station in each of said plurality of state update frames; and
a second program code to set said mobile station to one of an active state in which said mobile station can communicate with said base station, and a suspended state in which said mobile station cannot communicate with said base station in response to said state update data.

34. The medium according to claim 33, wherein said second program code sets said mobile station to said active state in a second state update frame subsequent to a first state update frame regardless of said state update data, when said mobile station receives a packet from said base station correctly in said first state update frame of said plurality of state update frames.

35. The medium according to claim 33, wherein the state update data comprises an activate notice to set the mobile station to the active state and wherein said second program code sets said mobile station to said active state during an active state duration time which begins from a time when the activate notice is received, regardless of said state update data, and sets said mobile station to said suspended state when said active state duration time ends, wherein
said active state duration time is longer than a time length of said plurality of state update frame.

36. A computer-readable recording medium storing a computer program product to operate a base station control apparatus for a mobile communication system in which a base station and a mobile station communicate based on a communication protocol in which a plurality of state update frames are defined in a time domain, said base station can transmit a state update data in each of said plurality of state update frames, and said mobile station is set to one of an active state in which said mobile station can communicate with said base station, and a suspended state in which said mobile station cannot communicate with said base station in response to said state update data, the computer program product comprising:
a program code to generate an active state duration time change notice specifying an active state duration time, during which said mobile station is set to said active state, and which is started when said mobile station receives said activate notice to set said mobile station to said active state; and
a program code to transmit said active state duration time change notice to said base station,
wherein said active state duration time is longer than a time length of said plurality of state update frames.

* * * * *